United States Patent
Froelich

(10) Patent No.: US 11,121,650 B2
(45) Date of Patent: Sep. 14, 2021

(54) DIRECT CURRENT MOTOR COMBINATIONS FOR ELECTRIC VEHICLES

(71) Applicant: Michael L Froelich, Austin, TX (US)

(72) Inventor: Michael L Froelich, Austin, TX (US)

( * ) Notice: Subject to any disclaimer, the term of this patent is extended or adjusted under 35 U.S.C. 154(b) by 60 days.

(21) Appl. No.: 16/686,195

(22) Filed: Nov. 17, 2019

(65) Prior Publication Data

US 2021/0152105 A1 May 20, 2021

(51) Int. Cl.
*H02P 5/69* (2006.01)
*B60K 1/04* (2019.01)
*H02K 7/116* (2006.01)
*H02P 5/695* (2006.01)

(52) U.S. Cl.
CPC ............. *H02P 5/695* (2013.01); *B60K 1/04* (2013.01); *H02K 7/116* (2013.01); *B60K 2001/0438* (2013.01); *B60K 2001/0455* (2013.01)

(58) Field of Classification Search
CPC ..... B60K 1/04; B60K 2007/0038; H02P 5/74; H02P 5/00; H02P 5/68; H02P 5/69; H02P 5/747; H02K 7/116
See application file for complete search history.

(56) References Cited

U.S. PATENT DOCUMENTS

| 5,134,346 | A * | 7/1992 | Schneider | B23H 7/26 318/8 |
| 6,725,134 | B2 * | 4/2004 | Dillen | F02D 29/02 123/339.18 |
| 7,034,480 | B2 * | 4/2006 | Kumar | H02P 3/14 318/362 |
| 8,102,077 | B2 * | 1/2012 | Neher | B60W 10/06 307/9.1 |
| 9,408,343 | B2 * | 8/2016 | Wyatt | B60L 1/003 |
| 9,764,734 | B1 * | 9/2017 | Brown | B60W 30/04 |
| 10,086,821 | B2 * | 10/2018 | Hokoi | B60W 20/11 |
| 10,392,007 | B1 * | 8/2019 | Brown | B62D 11/12 |
| 10,925,216 | B1 * | 2/2021 | Brown | B60K 17/00 |
| 2005/0023052 | A1 * | 2/2005 | Beck | B60K 17/046 180/24.07 |

\* cited by examiner

*Primary Examiner* — Thai T Dinh
(74) *Attorney, Agent, or Firm* — Kal K Lambert; Lambert Patent Services LLC

(57) ABSTRACT

A vehicular propulsion system is described that uses a plurality of direct current (DC) motors operatively attached to a common drive shaft or shafts of an electric vehicle (EV) or boat. Each motor is powered separately by direct current from a battery cassette or trays swappably inserted into the chassis of the vehicle. The battery cassettes are secured in racks, with one or more individual battery cassettes connected to each of individual motors. The individual battery cassettes are sized to have a weight suitable so as to be readily swapped out as needed for recharging, maintenance or replacement, enabling vehicle range to be extended en route by exchanging depleted battery cassettes for new batteries whenever needed. DC motors may be selected to obtain efficiencies greater than obtainable with AC motors, but require no expensive inverter unit.

21 Claims, 9 Drawing Sheets

DIRECT CURRENT MOTOR COMBINATIONS FOR ELECTRIC VEHICLES

TECHNICAL FIELD

This disclosure pertains generally to the field of solutions for powering electric vehicles.

BACKGROUND

The DC motor has been the mainstay of electric traction drives for many years. DC motors have fixed stator windings ("stator windings") and a rotatable shaft-mounted armature with commutate-able rotor windings ("rotor windings"), with permanent magnets, or with a combination of rotor windings and permanent magnets. Magnets may be surface-mounted, radially-mounted, or axially embedded in the rotor body. In some instances, the rotor poles are permanent magnets without a supplemental electromagnetic field. In brushless DC motors, the rotor windings may be inductively excited, but the induction is unipolar and alternating and polyphasic current are not used.

In DC motors, the stator windings are fed with switched current pulses of constant polarity timed to generate opposing magnetic fields between the stator and rotor poles. Where present, rotor coils may be series-wound, shunt wound, or compound-wound on poles of the rotor. Commutators may be brushed or brushless. By reversing polarity with an H-bridge or other switching circuit, motors can be operated in forward and reverse rotation.

Ányos Jedlik of Budapest University was the first to experiment with DC motors in 1827. Attempts to commercialize his models were made by Sturgeon (1832) and Davenport (1837). But it wasn't until 1871, when dynamos having the Pacinotti/Gramme ring armature having a smooth DC output were first demonstrated, that the history of the DC motor truly began. In 1886, Frank Julian Sprague invented the commercially feasible DC motor, a device capable of turning against variable loads at essentially constant speed. And of course Edison soon thereafter, in 1882, introduced a direct current electrical grid that seemed to poise DC motors for innumerable uses.

However, DC motors were rapidly eclipsed for most applications by Tesla's AC motors. In 1887, Nicola Tesla began producing AC induction motors based on a rotating polyphasic electromotive force (EMF). Interestingly, he first conceived them in Budapest, but after sailing for the United States, launched the product described in U.S. Pat. No. 382,279. And Westinghouse had already installed the first AC grid in the United States by 1886 and was rapidly taking market share from the Edison Electric company.

The widespread availability of AC power lead to market adoption of AC motors as the king of household appliances. From these foundations, by the turn of the century, electric motors had transformed society.

But despite the dominance of AC motors for many applications, the DC motor has continued to be a mainstay of industry. The primary reason is the capacity to control motor speed simply by controlling current and voltage. Variable speed controllers require only a few simple electrical components. In contrast, modern AC motors require complex inverters that contain sophisticated power transistor. Even simple AC motors of the day tended to operate at a fixed speed and required gearboxes or belts to adjust the rotational velocity. Although this limitation has been remedied by use of variable frequency drive controllers, AC motor types have a relatively narrow peak operating speed. DC motors are often better for acceleration, deceleration, and of course as stepper motors. Peak rotational velocities are typically different: DC motors will often operate in the range of 0 to 4000 RPM, or at most 8000 RPM, but AC motors typically operate at much higher RPM and higher voltage; often 3000 to 20,000 RPM and are supplied with a reduction gear or transmission to couple to an axle to reduce the speed to a practical level while achieving the needed torque. DC motors have efficiencies ranging to 95%, whereas AC motors typically lose 30% or more in control and gearing.

Motor performance must be considered in the context of an intended application. Electric vehicles (EV) are required to operate over a range of driving conditions, or "propulsion states." And hence are never conceived as having a static load. Driving characteristics in starting, accelerating, cruising, decelerating, and idle are of general interest. Given the capacity of DC motors to supply torque over a range of output speeds, their use in vehicular propulsion would seem to be a natural. However, after decades of development, the market for EV has come to be dominated by AC motors.

As used here, AC motors are those motors having sinusoidal current excitation with alternation of polarity. DC motors are characterized as motors driven by an applied voltage having a constant polarity. An H-bridge may be used to reverse the applied polarity, but the voltage and current are not polyphasic. For clarity, brushless motors are divided into two types, brushless DC motors (BLDC) having a DC voltage supply at the stator windings, and brushless AC motors (BLAC) having an AC voltage at the stator windings.

Many EVs in the 1990's were BLDC driven. Fisker Motors was an early exception by using two large, heavy, low speed/high torque AC PM motors (operating at about 3,800 RPM at 125 mph) and a manual transmission, but the approach was not commercially successful despite a 400 mile range from a 140 kWh lithium battery module. But over the last 20 years, there has been a major shift in the industry toward use of AC inverters with BLAC, with PMS (permanent magnet synchronous), or with PMR (permanent magnet reluctance) motors to drive increased motor speed and hence increased torque delivered to the power train. The driving magnetic field is characteristically sinusoidal and polyphasic as in the earliest induction motors invented by Tesla, not the sequenced switching magnetic field of true DC motors, including the BLDC and stepper motor types. Manufacturers using AC motors include Chevrolet, Ford, Tesla, Nissan, Volkswagen, and others. In part, the increased reliance on hybrid AC induction and reluctance motors has been in response to the limited supply of rare-earth permanent magnets.

With increased adoption of inverter circuitry for conversion of DC power to polyphasic AC power, the evolution in controllers has gone from voltage control to frequency control, and in the AC frequency control regime, the need for higher power output has led to a shift from motors operating at relatively modest RPM to motors operating at high and very high RPM. At higher speeds and larger discharge rates, there has been increased need for attention to thermal effects on the efficiency in the motor, the inverter, and the battery, leading to widespread adoption of liquid cooling systems. These are substantial changes with stepwise increases in system complexity.

Similarly, discharge and thermal operating characteristics of the battery units, power density, and efficiency may also be critical in commercial success because no truly regenerative technology (power recovery in excess of input) exists for extending battery life. The problem is exacerbated by deep discharge hysteresis and the batteries in many EV are overspecified explicitly so as to build in a bottom on the discharge cycle for commuter use. Thus there remains a need for solutions to EV propulsion that reduce complexity and improve performance.

There are several pros and cons in using a DC motor for an EV application. Historically, a major problem with brushed DC motors (BDC) is the commutator shaft on the rotor, for which contacting brushes provide electricity to the rotor windings. Brushes are inherently unreliable and can contribute to sparking. This limitation has been remedied by the development of brushless DC motors (BLDC) in which constant current is supplied to the stator windings in a series of "pulses" or "duty cycles" while advancing around the stator windings.

Advantageously, DC motors may be smaller. A smaller motor will have a smaller rotor. A smaller rotor means less inertia. DC motors accelerate and decelerate well with the propulsion state. With less rotor inertia, it takes less time and power to accelerate or decelerate. Cooling will also be easier, and speed control is simple. In a DC motor, speed is controlled by varying voltage so as to increase or decrease current to the windings, as can be done with a rheostat or other variable voltage power output, including a potentiometer or a bridge.

Despite these advantages, DC current is not sent to the stator windings by any of the major EV manufacturers. Non-hybrid EVs such as the Tesla and Leaf rely on one or a few AC electric motors powered by a single massive battery.

Prius (Toyota), while a hybrid EV, is designed to operate as an AC drive EV. The wheels and motor share one shaft of the power splitter and the generator/inverter is on a 2nd shaft. By coupling the DC links of the two inverters together, a dual power path from engine to wheels is created that functions as an infinitely variable transmission (including overdrive). All the torque and power sharing control is provided by AC drive currents of the two inverters. The Toyota power splitter is mechanically geared.

The Prius AC motor type is classed as a "Permanent Magnet AC Synchronous Motor", but appears to be a combo PM/variable reluctance motor. It is commutated with a resolver and solid state circuitry. The variable reluctance is dominant. The torque vs speed curves show a strong constant power region, suggesting that the AC motor operates above the motor base speed. In early models, the motors were large diameter radial flux motors with a top speed of 6700 RPM that generated very large centrifugal forces. Motor size was eventually reduced by increasing speed to 12400 RPM.

Rotor RPM on the Bolt AC motor has been increased to about 8.8 kRPM (360 Nm peak torque), but that is much lower than the 15 kRPM of the Tesla. Operating bus voltage is typically 600-1200V with 1200V IGBTs for driving the field coil frequency.

The use of AC motors by the industry shows a clear trend to higher performance vehicles and style over efficiency or reduced carbon footprint. AC induction motors (made by AC Production) achieved the land speed record for an electric vehicle. Impressively, the EV reached 245 mph in a 150 KW dual motor system. By combining AC motors with reduction gearing, consumers are now offered "high performance vehicles" that so resemble the drive experienced with large combustion engines that well-heeled consumers have finally begun to let go of their passion for pistons.

However, given the complexity of the systems being developed and the need to reduce prices while increasing range of travel, there is a need for a fresh approach that simplifies the powertrain, increases travel range, and reduces weight. A solution to battery life, recycling and replacement is also needed, and in this kind of engineering, the solution to any one problem is impacted by the solutions to other problems, so that trade-offs are made that reduce performance or utility and synergy is difficult to achieve. Thus there is a need for further innovation.

SUMMARY

A vehicular propulsion system is described that uses several direct current (DC) motors operatively attached to a common drive shaft of a vehicle. According to one embodiment, smaller DC motors are ganged so that torque is additive. The motors share a controller linked to an accelerator pedal, each motor contributing a part to the total torque available. Multiple battery cassettes, each lightweight and exchangeably replaceable to restore full power capacity, are provided to supply power to the motors. Each motor receives power from a subset of the battery cassettes. Each tray has a hot lead and a ground corresponding to battery chemistry anode and cathode, and plugs into an electrical conduit to a motor or to the vehicle electrical system. A battery controller is optional.

According to another embodiment, different motor types may be mixed in the drive train so as to overlap complementary torque or power curves, and are operated so as to be optimized for particular driving conditions. All of the motors are ganged to a common drive shaft, but only a subset of the motors are powered at any given time. Thus some motors will be actuated during startup and acceleration and others during highway cruise, for example. The advantage is that the properties of different kinds of DC motors are matched to the kind of driving being done. Each motor is powered separately by direct current from a battery cassette or trays swappably inserted into the chassis of the vehicle. Each battery cassette is lightweight. The battery cassettes can be exchanged with fresh battery cassettes when needed. A battery controller is optional.

Each battery cassette may have tens or hundreds of individual battery cells, some of which may be wired in series and others in parallel to achieve the desired voltage across the anode to cathode of the tray. Battery bays may be provided with racks to assist in removing and replacing individual battery cassettes. The battery bays are designed to optimize cooling, and individual battery cassettes are sized to be readily swapped out as needed for recharging, maintenance or replacement, or for exchanging a discharged battery for a new battery en route so as to extend range between recharging stops.

The torque delivered by the smaller motors is additive, so that two like motors have twice the torque as one, and four may have four times the torque. Alternatively, by combining unlike motors having torque curves optimized for different propulsion states, improved mileage is obtained under real world driving conditions. Propulsion states include "idle," "start," "accelerate," "hillclimb," and "cruise", according to one embodiment.

By splitting the battery units into smaller portable units, a capacity to swap out and replace individual depleted units is achieved. This has the effect of enabling a business model having the "fill up" capacity that the public is accustomed to. As battery power becomes depleted during a drive, the driver may pull in to a service station where the battery pack or tray replacement is finished in a few minutes, for example. These stations can be termed, "battery exchange and recharging stations" (BEARS) for example. This results in a new business market. There may be a need for either manual or robotic servicing of battery units. The smaller battery cassettes may be provided with handles and bearing surfaces in the racks and bays to facilitate installing fresh trays manually. Or robots can quickly pull used battery cassettes from readily accessible service ports and slide in new battery cassettes for a 2 min "top-up" so that the driver can keep going. Of course, some batteries are rechargeable, and home or office rechargers may be used when the vehicle will be parked for an extended period.

A discharge governor can be set so that a target battery discharge level is regulated. Some users may choose a 50% discharge maximum; others an 80 or even 90% discharge. There is typically an emergency over-ride feature so that power is not interrupted if service is not immediately available. A battery controller may be used to complement the motor controller(s) so as to coordinate battery usage with the basic propulsion states of "idle," "start," "accelerate," and "cruise", according to one embodiment.

Instead of customary batteries, fuel cells may also be used to supply power to the motors and may be self-contained so as to be exchangeable when exhausted.

According to one embodiment, the electric vehicle is provided with lightweight exchangeably replaceable battery cassettes, and comprises: a vehicular chassis with one or more driven axle; a single common drive shaft for each driven axle; a battery rack or racks having each an access port and a plurality of individual bays configured to receive and secure the exchangeably replaceable battery cassettes; one battery cassette individually insertable into each of the bays, each bay having a guideway externally accessible on the vehicular chassis, wherein each guideway is configured to receive and secure therein a battery cassette; three or more of like DC electric motors operated in synchrony, each like DC electric motor having an electrical power connection to the one or more of the bays (and the battery cassettes) in the battery rack; and in which the three or more like DC electric motors are in mechanical linkage with a single common drive shaft having an operative mechanical connection to a wheel axle in need of rotary power; such that the total torque $T_t$ deliverable at the wheel axle is the sum of the torque output from all of the like DC electric motors.

According to another embodiment, the electric vehicle or boat is provided with a plurality of lightweight exchangeably replaceable battery cassettes, and comprises: a vehicular chassis with one or more driven axle; a single common drive shaft for each driven axle; a battery rack having an access port and a plurality of individual bays configured to receive and secure the exchangeably replaceable battery cassettes; one battery cassette individually insertable into each of the bays, each bay having a guideway externally accessible on the vehicular chassis, wherein each guideway is configured to receive and safely secure a battery cassette; three or more of unlike DC electric motors, each DC electric motor having an electrical power connection to the one or more of the bays (and the battery cassettes) in the battery rack; and in which the three or more unlike DC electric motors are in mechanical linkage with a single common drive shaft having an operative mechanical connection to a wheel axle in need of rotary power; such that each of the three or more unlike DC motors is configured to optimize motor efficiency in one or more of propulsion states that define an idle mode, a start mode, a cruise mode, and an acceleration or a braking mode. In practice, all DC motors are not operated in synchrony, but are instead one or more of the motors are operated to optimize performance under particular driving conditions.

These and other elements, features, steps, and advantages of the invention will be more readily understood upon consideration of the following detailed description of the invention, taken in conjunction with the accompanying drawings, in which presently preferred embodiments of the invention are illustrated by way of example, and in the claims.

The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the inventive art disclosed here are more readily understood by considering the drawings in conjunction with the written description including the claims, in which:

Figure 1:
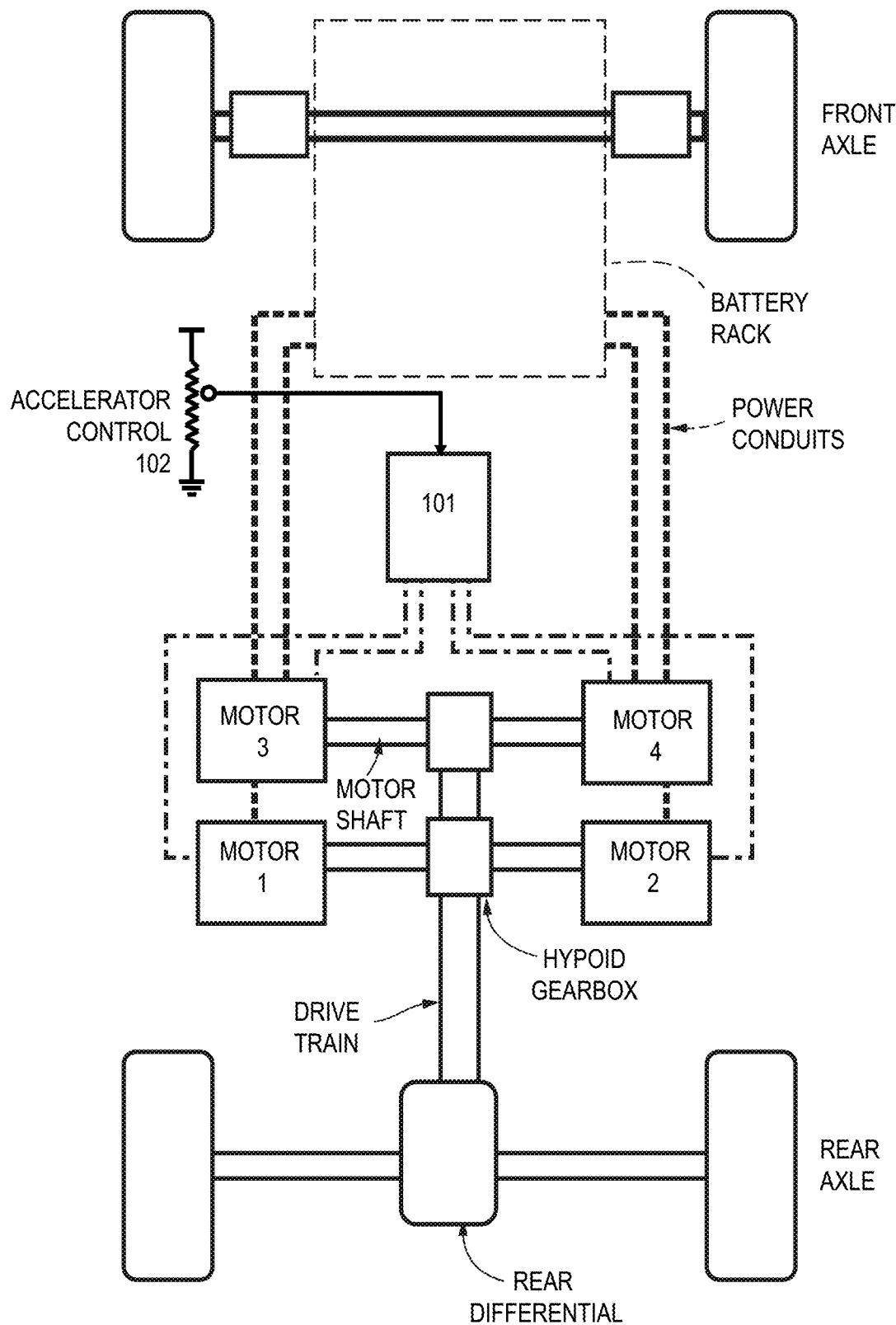
FIG. 1 is first embodiment of an electric vehicle having four motors coupled by a common drive shaft to an axle. Also shown is electrical wiring for supplying battery power to the motors and linkages between each of the motors and a controller suitable for operation of DC motors. No inverter is needed.

The drawing figures are not necessarily to scale. Direction of motion or coupling of views may be shown by bold arrows or boxed figures without further explanation where the meaning would be obvious to one skilled in the arts. Certain features or components herein may be shown in somewhat schematic form and some details of conventional elements may not be shown in the interest of clarity, explanation, or conciseness. It is to be expressly understood that the drawings are for illustration and description only and are not intended as a definition of the limits of the invention.

DETAILED DESCRIPTION

Although the following detailed description contains specific details for the purposes of illustration, one of skill in the art will appreciate that many variations and alterations to the following details are within the scope of the claimed invention. The following glossary is set forth as an aid in explaining the invention as claimed.

Glossary and Notation

Certain terms are used throughout the following description to refer to particular features, steps or components, and are used as terms of disclosure and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

A "traction motor" is an electric motor used for propulsion of a vehicle, such as locomotive, electric roadway vehicle, or boat.

A DC motor uses a voltage drop across field and or rotor windings to generate interacting magnetic fields that turn the motor. Motors revolve in response to pulses of voltage and current. The pulses and pulse width may be shaped by a controller. The applied voltage has a constant polarity. An H-bridge may be used to reverse the applied polarity, but the voltage and current are not polyphasic.

An AC motor uses an oscillating current to turn the motor. The frequency of the current oscillations determines rotational velocity. As used here, AC motors are those motors having sinusoidal current excitation with alternation of polarity and hence alternation of current direction.

As used here, the term "brushless DC motor" (BLDC) describes a DC motor having a progressing magnetic field that is typically imposed stepwise (as in a duty cycle) on three or more stator poles. The rotor has three or more secondary magnetic fields each of a permanent magnet. BLDC are typically driven by rectangular or trapezoidal voltage strokes coupled to a given rotor position. Rotor position may be determined with sensors, but sensor-less BLDC are also known. Speed is a function of voltage or may be controlled using pulse-width modulation, for example. A simple encoder or an H-Bridge may be used to switch the voltage between poles, often resulting in a torque ripple and a cogging effect.

The term "brushless AC motor" (BLAC) describes a brushless armature driven by an AC current from a variable-frequency inverter. In PMSM (permanent magnet synchronous motor) the excitation current waveform is sinusoidal, eliminating the torque ripple caused by the stepwise commutation of the BLDC. The dynamic part of the magnetic field is generated by current phase as it rotates through three or more coils during each motor revolution.

Given that the structure of the motor stators of BLDC and 3-phase AC induction motors is quite similar, a major difference is in the controllers, magnetic fields, and the rotors. Both stators have three sets of windings in the stator core. The rotor is where the essential difference between the two kinds of machines are found.

Unlike the DC brushless rotor, Tesla's classical induction rotor has no magnets. The rotor has stacked steel laminations integrated into a set of peripheral conductors that form a "shorted structure." Current flowing in the stator windings produces a rotating magnetic field that excites the rotor. The frequency of the magnetic field generates a counter electromotive force and opposing magnetic field that is proportionate to the difference between the applied electrical frequency and the rotational frequency of the rotor itself. The induced voltage across the shorted conductive elements is proportionate to the speed difference between the rotor and the electrical frequency of pulses in the stator windings. Lagging currents are produced within the rotor conductors that are approximately proportionate to the induced voltage. The currents interact with the secondary magnetic field to produce rotor torque.

In the absence of an inverter, the rotor speed is dependent on the line phase frequency. But by use of an inverter, frequency control is achieved and higher frequencies drive the rotor at greater speed. For an AC induction motor, torque is generated at any angular position of the rotor and the motor can start even under load. But for brushless AC machines, the power curve may maximize at a peak in the middle of a frequency range, lowest at zero starting speed and decreasing past the peak. Torque efficiency will generally be lower than a DC motor, but by optimizing the harmonics in the fields, competitive power outputs can be achieved for EV applications.

Electric vehicles may be powered by DC or AC motors, but there are trade-offs. AC motors require substantially greater RPM than DC motors to achieve comparable torque. DC motors are typically controllable by controlling voltage or current, whereas control of AC induction motors is done with frequency and typically requires an expensive inverter. DC motors are commonly cited as being more efficient than AC motors—due to the secondary magnetic field inherent in the permanent magnets. The rotor of a motor that uses permanent magnets is not dependent on a supply of current to generate a magnetic field. Maximum speed of a DC motor is typically less than 8000 RPM whereas AC induction motors in commercial use may have speeds of 17,000 RPM, for example, depending on the performance desired. Not all DC motors are self-starting but AC motors typically have a sweet spot in the rotational speed and excitation frequency associated with maximum torque, whereas DC motors have a broader power range that increases directly with current. Typical AC motor setups will include a reduction gear or gears for varying the axle speed independently from the motor speed. DC motors may have direct drives in which the axle speed is varied by varying the motor speed and hence may function without a transmission.

"Brushless" is a term of art when used in electric rotor technology that entails the use of non-mechanical, non-contacting means for distributing voltage to the rotor windings. For clarity, brushless motors are divided into two types, brushless DC motors (BLDC) having a DC voltage supply at the stator windings, and brushless AC motors (BLAC) having an AC voltage at the rotor windings.

A "differential" is a gearbox designed to drive a pair of wheels on an axle during a turn by allowing the wheel on the outside of the turn radius to rotate faster than the inner drive wheel.

An "epicyclic differential" can serve as a compact reducing gear and may be used to apportion torque asymmetrically between the front and rear axles. A sun gear on a shaft is engaged with a set of planetary gears mounted on a carrier. When the carrier and the ring gear are stationary, the sun gear/planetary gear ratio is the torque multiplier. When the carrier is rotated, the sun gear/ring gear ratio is the torque multiplier. A stack of stepped planetary gears may also be used. In a typical application, the power train from the motors drives a sun gear on a center axis. The sun gear then drives the planetary gears mounted on a rotating carrier. By causing the planetary gears to engage a fixed ring gear, the carrier rotates and may drive a secondary shaft at a speed reduced according to the ratio of teeth of the sun gear to teeth of the ring gear.

"Gear train" relates to a series of gears designed to achieve a particular overall gear ratio. The gear ratio may be a reduction gear ratio having a ratio of driven gear to driving gear of greater than one or an overdrive gear ratio having a ratio of driven gear to driving gear of less than one. EV's may have a transmission or gear train that enables the vehicle to operate at more than one gear ratio or over a variable range of gear ratios. EVs operating with AC motors typically require reduction of the motor's angular rotational velocity. For example the Tesla may have a gear ratio of 10:1 because of the high rotational velocity of the motor, General connection terms including, but not limited to "connected," "attached," "linked," "coupled," "conjoined," "secured," "mounted", and "affixed" are not meant to be limiting, such that structures so "associated" may have more than one way of being associated. "Digitally connected" indicates a connection for conveying a digital signal therethrough; "electrically connected" indicates a connection for conveying or sensing a current or a voltage therethrough; "electromagnetically connected" indicates a connection or linkage for conveying or sensing a Coulombic or Lorentz force therethrough; "mechanically connected" indicates a connection, mechanical stack, or linkage for conveying or sensing a force therethrough; fluidly connected" indicates a connection for conveying a fluid therethrough, and so forth.

Relative terms should be construed as such. For example, the term "front" is meant to be relative to the term "back," the term "upper" is meant to be relative to the term "lower," the term "anterior" is meant to be relative to the term "posterior," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. "Processor" refers to a digital device as part of a "computing machine" that accepts information in digital form and manipulates it for a specific result based on a sequence of programmed instructions. Processors are generally supported by non-volatile memory (for storage of programmable instructions, e.g., ROM) and dynamic memory (e.g., RAM), a timing clock or clocks, and digital input and outputs as well as one or more communications protocols. One or more processors may be integrated into the display, calculation, sensor and communications modules of an apparatus of the invention, and may communicate with other microprocessors or with a network via wireless or wired connections known to those skilled in the art. The comprehensive term "computing machine" includes individual computers, software engines, or servers operating independently and/or formed into networks, the network constituting a machine.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

When describing the claimed inventions, unless the context requires otherwise, throughout the specification and claims that follow, the term "comprise" and variations thereof, such as, "comprises" and "comprising" are to be construed in an open, inclusive sense—as in "including, but not limited to." Further, the appended claims are not to be interpreted as including means-plus-function limitations, unless a given claim explicitly evokes the means-plus-function clause of 35 USC § 112 para (f) by using the phrase "means for" followed by a verb in gerund form.

Types of DC Motors

DC motors may be selected for a) higher starting torque, b) quick starting and stopping, c) quick reversing, d) variable speed with voltage or current control. Circuitry for controlling DC motors may be much simpler than that used for an AC controller. A primary reason for selecting DC motors when designing an EV is the simplicity of the control circuitry. Not all types of DC motors are equal in all performance properties.

DC motors are sometimes classified into four main types, each of which having different performance characteristics. Some of the classifications are overlapping. The types are: permanent magnet (PM) DC motors in which permanent magnets are used to create a field in the rotor (with or without rotor windings); series-wound DC Motors in which the full rotor current is also passed through the stator windings; shunt-wound DC Motors having stator and rotor windings on parallel circuits; and compound DC motors in which the stator windings are split so as to better control back-EMF. Another category is brushed and brushless, in which motor types are divided between motors in which mechanical brushes are used for commutation (as in carbon brushes on an armature or slip rings, for example), or motors in which permanent magnets on the rotor respond to brushless switching of current pulses in the stator windings.

DC motors having permanent magnets (PM) achieve the greatest efficiency. Permanent magnet motors are typically made with neodymium-iron-boron (NdFeB), samarium-cobalt, neodymium-dysprosium, or ferrite magnets mounted on the rotor. The secondary magnetic field generated by the magnets is not induced by current, thereby achieving a 30% increase in efficiency over shunt- and series-wound DC motors. Permanent magnet motors may exhibit an undesirable effect called "cogging" that results in torque ripple and reduced efficiency. Cogging can be controlled by a technique termed pulse width modulation as described below.

However, permanent magnet motors can be very efficient, often 95% or greater, as the rotor losses are very small. BLDC PM drives have excellent dynamic performance over a broad range of rotational velocity up to their base speed $n_b$.

BLDC permanent magnet configurations may be axial, radial or surface mounted. The BLDC PM radial motor gives the best acceleration using pulse width modulation and frequency to control speed.

In a BLDC PM motor, the stator windings work in conjunction with permanent magnets on the rotor to generate a nearly uniform flux density in the air gap. Nearly constant DC voltage is applied to the stator coils, and the voltage switches from one stator coil to the next to generate a voltage waveform with a generally trapezoidal shape.

BLDC motors may be commutated with field-oriented control, encoders for example with Hall-effect positional feedback, resolvers, or shunt-excited or compound-excited motors assisted by magnetic coupling of surface, radial or embedded permanent magnets so that the torque curves are complementary over a range of frequencies from 0 to 8000 rpm. A resolver is an analog rotary electrical transformer used for measuring degrees of rotation, but more broadly may include digital resolvers. Rotary and pulse encoders may also be used for controlling commutation. Encoders include logic gates and switches to use rotational position (obtained from sensors) to deliver sequential pulses of voltage to the motor windings. An "H-bridge" is a simple four-transistor switch in an IC that permits controlling speed by "pulse width modulation" and enables reversing the motor. Pulse width modulation and frequency are used to control DC motor speed, limit startup current to prevent burnout, and to limit torque ripple by shaping the pulse waveform. PWC processor clock frequency must be greater than switching frequency in order to reduce torque ripple inefficiencies, but switching frequency may be limited by thermal dissipation issues. For example, 3000 rpm corresponds to 50 Hz and would benefit from a clock frequency of at least 500 Hz, but higher clock frequencies may result in greater thermal loads.

Position sensing is required for commutation. Hall effect or optical position sensing may be used. Alternatively a sensorless scheme can be used in which back EMF is monitored directly by a controller. Sensorless switching simplifies motor construction. However, because a stationary motor generates no back EMF, the controller is unable to determine the motor position at start-up. One solution is to start the motor in an open loop configuration until sufficient EMF is generated for the controller to determine rotor and stator position and then take over supervision. Another solution is to provide a separate DC motor which is insensitive to rotational position, such as the series-wound DC type, which has high torque even at zero RPM and can be used to hold a load stationary as well as to propel it from zero to full speed.

Thus use of a series-wound DC motor in combination with a BLDC motor having sensorless switching offers an advantage in simplified construction and control of an EV propulsion in which torque is generally additive when both motors are on, but switches from one motor to the other when transitioning from startup to cruise or back to stop and idle.

The selection of a BLDC motor can be dictated by a native base in the torque curve versus speed (specified as a speed $n_b$) in which the motor reaches peak performance without an excess of back-EMF. "Field weakening" (described below) of BLDC PM motors makes it possible to extend their speed range, but requires more motor current, and so the motor becomes less efficient in the field-weakened range. This form of control also increases the rotor losses and raises the temperature of the magnets. Therefore care is exercised in selecting BLDC PM to optimize the $n_b$.

A motor selected for an $n_b$ of 3000 rpm may require that a higher speed BLDC PM motor having an $n_b$ of 6000 rpm also be used so as to optimize efficiency.

Stepper motors are another specialized class of DC motors in which pulse control is derived from and shaped by digital circuitry with processor clock. Shunt-wound DC motors have several disadvantages, a limited capacity to vary speed is the most compelling, that limit their use in EVs.

Selection of an optimal motor or combination of motors is possible only when the load regimes are broken down into multiple propulsion states needed in an EV application. Consideration of propulsion states over a range of driving conditions suggests that an EV having a motor optimized for that percentage of total use requiring peak performance is wasteful, and as taught here, having multiple EV motors, each optimized for a part of required propulsion states, results in increased efficiency and performance, particularly when paired with a smart battery controller.

Electric vehicles (EV) are required to operate over a range of driving conditions, or "propulsion states." Driving characteristics in starting, accelerating, cruising, decelerating, and idle are of general interest. Urban dynamometer driving schedule (UDDS) is an industry standard driving condition testing protocol that attempts to relate performance to a mix of real-world driving conditions in which idle, starting torque, acceleration, hill climbing, cruise and braking are all considered. Another comparative testing standard is HWFET (highway fuel economy driving schedule). The real-world propulsion conditions that make up the driving schedules are described in more detail in Huynh TA and MF Hsieh, 2018, Performance analysis of permanent magnet motors for electric vehicles (EV) traction considering driving cycles; Energies 11:1385 (doe:10.3390/en1106385), which is incorporated here in full by reference. No one motor can be optimized for all driving states when all factors are considered, including thermal load, battery efficiency, and the relationship between motor speed, torque and power.

The torque characteristics of DC motors can be optimized for three propulsion states that correspond to particular driving conditions of the UDDS schedule. As a function of speed or motor velocity, (1) a "constant torque region" is defined below base speed $n_b$, followed by (2) a "variable torque-constant power region" over which field current is weakened to increase motor speed. As speed increases, there is a transition to a (3) "variable torque, variable power region" in which greater speed is achieved and both power and torque are dependent on speed.

In the constant torque region, as motor voltage is increased from zero to base voltage, the ability to develop full torque remains constant as speed increases. Motor power increases from zero to rated power as the voltage changes while torque is constant. Peak torque as a function of power occurs at $n_b$, the base speed where torque is greatest and back-EMF is not so large as to reduce efficiency. This characteristic of a DC motor is favorable for conditions in which speed is varied while fully loaded, but limits DC motors to a range of velocities up to an $n_b$ for which the motor is optimized.

In the variable torque-constant power region, above $n_b$, field current is weakened to increase motor speed (and hence this region may also be called the field-weakening operating range for the motor). This operating range normally extends from the base speed to a speed that is about two or three times the base speed. When at base speed (full voltage) and the field current is reduced, the motor increases in speed. In this region, the power remains constant as speed increases.

The increase in speed comes at the expense of a reduction in the torque available to turn the load.

An extension of the field-weakening range is seen in the third operating range, where torque and power are both variable and are dependent on motor speed. This extended field-weakening range ranges from about four to five times the base speed. As the field is further weakened for even greater speed, it gets more difficult for the current to move into the rotor windings because of the counter-EMF. Power is no longer constant as in the field-weakening range, because now both power and torque are dependent on speed.

Thus by selection of multiple DC motors, efficiency of operation in a broader range of driving conditions can be achieved. And by use of multiple smaller motors in which torque is ganged on a common drive shaft, whether the motors are of like type or mixed types, improved air cooling and reduced thermal deterioration of performance can readily be achieved.

Detailed Description of the Figures

FIG. 1 is first embodiment of an electric vehicle having four motors coupled by a common drive shaft to an axle. Also shown are linkages between each of the motors and a controller and electrical wiring for supplying battery power to the motors.

The four motors are shown as linked to a drive controller 101 that is responsive to accelerator control (shown here as a variable potentiometer, 102). The four motors may be linked to a drive shaft or may be mounted directly and mechanically coupled to an axle. In this instance, rear wheel drive is illustrated. Each motor in this illustration is linked to a separate battery, shown here in a battery stack as is contained in a housing termed a "battery rack". The battery rack includes electrical connections to each of the motors and a locking system to secure the battery cassettes in place. An access panel in the vehicle chassis (not shown) seals and weatherizes the interior where the batteries are secured. Guideways may be used so that individual battery cassettes are slid home. The access panel is necessarily larger than the body door typically found over the fuelcap of a gas-driven vehicle, but is analogous in function. The battery rack is designed to disconnect in the event that the access panel is opened or in the event of a collision with short where batteries may become grounded through the chassis. Typically the battery rack will have a low center of inertia relative to the chassis. Here the batteries are shown supported over the front axle.

In a first embodiment, the motors are all of a like type. That is, each motor is essentially identical and has a like power curve and specifications. The torque generated by each motor is applied to a common drive shaft and the torque is essentially additive. Smaller motors are used because they are easier to cool and lighter. Motor speed is controlled using a simple potentiometer and the motor output to a common drive shaft is geared so that driven axle speed is controlled at gearboxes or by a transmission. Here a pair of hypoid gearboxes are synchronized and any reduction in gearing or overdrive is made. Optionally, a transmission may be provided.

Motors 1, 2, 3, 4 may have different construction and torque/power curves. The drive controller is configured to actuate and control each motor according to the propulsion state that best matches the current driving conditions. For example, initial starting may be best performed by a series-wound DC motor, acceleration to a BLDC PM motor with high $n_b$, and cruising mode to a BLDC PM with an intermediate $n_b$. The base speed $n_b$ relates to a base operating range of a DC motor in which speed increases linearly with voltage up to a base point ($n_b$) where voltage in the coils is saturated and back-EMF will increase with any further current. Further increases in speed are achieved by field-weakening or by gearing. A transmission or optionally one or more clutches may be used so that all four motors are not engaged continuously and may be "at rest" unless activated for a particular driving condition.

In one embodiment, series-wound DC motors are used in combination with BLDC PM motors. For EV applications, brushless motors are preferred. BLDC PM motors may be commutated with field-oriented control, encoders with Hall-effect positional feedback, resolvers, or shunt-excited or compound-excited motors assisted by magnetic coupling of surface, radial or embedded permanent magnets. One of the BLDC PM motors may be configured to provide torque at a first $n_b$; another BLDC PM motor may be configured to provide torque with a higher $n_b$. Two or more BLDC PM motors may be ganged so as to provide additive torque. The torque curves of the various BLDC PM motors may be selected to be complementary over a range of frequencies from 0 to 8000 RPM as useful over a range of driving conditions.

A simple controller is used in conjunction with a user interface for controlling speed and driving parameters. Shown here is a potentiometer that controls acceleration. The controller is also relatively simple. An "H-bridge" is a simple four-transistor switch in an IC that permits controlling speed by pulse width modulation and enables reversing the motor. A resolver is an analog rotary electrical transformer used for measuring degrees of rotation, but more broadly may include digital resolvers. Rotary and pulse encoders may also be used for controlling commutation. Encoders include logic gates and switches configured to assess rotational position of the rotor (obtained from sensors) to deliver sequential pulses of voltage to the motor windings.

Figure 2:
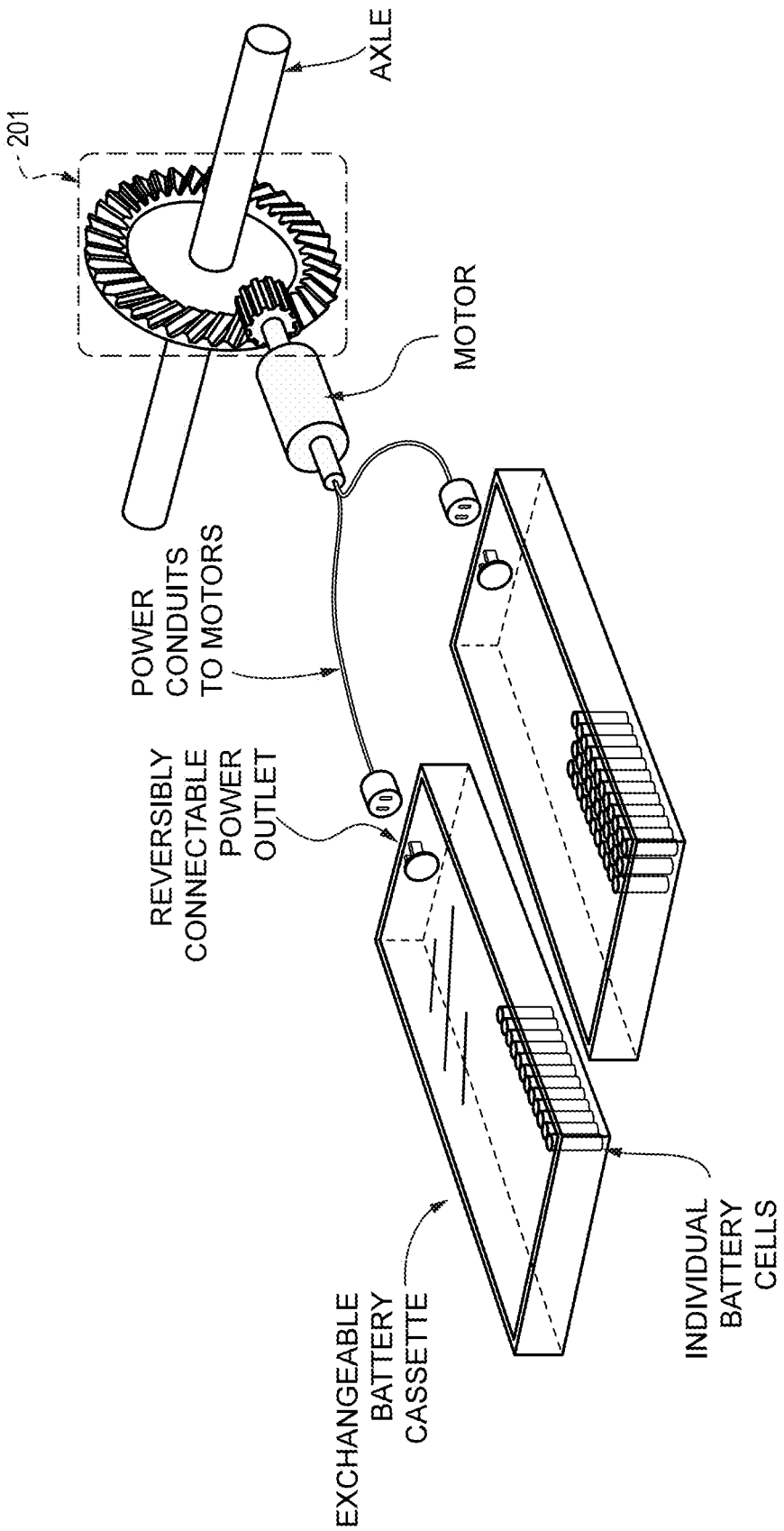
FIG. 2 is a view of a pair of battery cassettes electrically powering a motor which is mechanically coupled through a reduction gear to a vehicle axle.

FIG. 2 is a view of a pair of battery cassettes or trays electrically powering a motor which is mechanically coupled through a drive shaft and differential gearbox 201 to a vehicle axle. Each battery cassette or tray consists of a housing with internal individual battery cells in close packing according to this embodiment. The cells may be wired in series, but more generally units of cells are wired in parallel and the battery units are wired in series to increase both the available current and the voltage of the Voltaic pile. The voltage provided by individual cells may be only 1-3 V, depending on the battery chemistry, but the overall voltage of a battery cassette may be some multiple of 12 V by convention and may be up to several hundred volts.

Each battery cassette is a voltaic pile containing multiple battery units. Battery units consist of cells arranged so that the voltage is additive. Four chemistries are of common interest. These include Nickel-Metal Hydride (Ni-MH), Nickel Cadmium (NiCad), Lead-Acid, and Lithium-ion (Li-ion) chemistries. Fuel cells may also be considered as a power source.

Nickel Metal Hydride (NiMH) cells have a specific energy of 60-120 W-h/kg, an energy density of 140-300 W-h/L, a specific power of 250-1000 W/kg, a self-discharge rate of about 1.3-2.9%/month, and a cycle durability lifetime of about 2000 cycles. NiMH chemistry is not susceptible to the recharging "memory effect" that is seen with NiCads. NiMH cells can have an energy capacity two to three times that of NiCads, the cell energy density approaching that of LiIon (LiPo) batteries, while at significantly less cost than lithium.

Nickel cadmium (NiCad) cells have a specific energy of 40-60 W-h/kg, an energy density of 50-150 W-h/L, a specific power of 150 W/kg, a self-discharge rate of about 10%/month, and a cycle durability lifetime of about 2000 cycles.

Lithium batteries are generally characterized as having a lifespan of fewer charging cycles (400-1200 cycles), but have a specific energy of 100-260 W-h/kg, an energy density of 250-690 W-h/L and a specific power of up to 340 W/kg. Lithium batteries do not have a long lifetime when discharged below 50% of capacity.

A major issue with EV battery technology is temperature. In the massive batteries used in many EV, fire risk must be engineered. Public appreciation of the fire risk is largely the result of Boeing's early attempts to introduce Lithium Ion batteries on airplanes. Boeing initially used cobalt lithium ion to energy density and reduce weight. This battery chemistry, however, had the risk that at about 140° C., they go into thermal runaway and the fire can explode. Several serious fires were reported. Fisker and Tesla both experienced fatal fires with their EVs.

Each cell of a Lithium Ion battery is a stack of sandwiched layers. The insulator material is only 1 mil thick. At high temperatures, pinhole defects in the insulator will develop. Current will surge through any pinhole to short the battery and local burning will start. The reaction is exothermic and releases oxygen, so the burning will quickly spread through the whole battery unit and cannot be stopped.

Battery heat generated during discharge may be air cooled passively or actively, or may be conducted using a liquid circulating coolant loop connected to a radiator. Liquid cooling is more reliable but more complex and demanding to engineer, and certainly limits any easy swap-out of battery cassettes.

In one early Tesla model, the battery was built up from eleven 33.3V battery 'sheets' that plug into a rack. Each 56 KWh rack includes 11 sheets. Each sheet (33.3V, 152 A) has 621 cells arranged as 69 bricks wired in parallel. Each cell is 3.7V. The cells of each sheet are in a single layer. Each sheet module is 4.4" thick and about 17" on a side. The total battery pack is rated for 56 KWh and contains 6,831 cells in 11 sheets. The battery pack is 4 to 4.5 ft long and weighs 990 lbs. More recently, a larger individual cell has been introduced and in an extended range model, the 100 KWh battery has over 8000 cells. There is disagreement about the number of charges tolerated by Tesla batteries, and is dependent on whether the battery packs are allowed to discharge below 50%. By reducing deep discharge, longer battery life is achieved.

Leaf (Nissan) and Volt (Chevrolet) stack 96 lithium ion modules in a Voltaic pile termed a cell. The battery chemistry is a little different but the lithium ion cells are again about 3.6V and the output voltage is about 345 VDC (open circuit). The Volt uses three cells in parallel in each battery subunit (288 cells total), and the leaf uses two cells in parallel in each of its subunits (192 cells total). The Volt uses liquid heating/cooling to keep the battery temperature within a very narrow range (70±2° F.). In contrast the Leaf still air cools the battery pack with a fan and does not support high performance driving.

The Bolt uses a 60 KWh battery that weighs 960 pounds and has a 238 mile range. Extended range Tesla's use a 75 KWh battery with a 300 mile range. The cells are designed to be fast charging (i.e., overnight), but do not fare well with repetitive deep cycling. Hysteresis associated with deep discharge is a serious problem for the massive battery, given the large amount of work needed to replace and rebuild each battery unit. Owners are encouraged to "top up" by charging frequently, and by limiting their range and their duty cycle between charges, so the vehicles are not adapted for repeated long hauls where deep discharge is necessary. Recharging must be done on board the vehicle because of the large size and weight of the battery.

As described here, smaller battery cassettes enable increased battery life and improved performance. Reduction of size of the battery cassettes is an innovation because the weight of conventional battery packs has limited the kind of fuel-up-and-go driving consumers are accustomed to with liquid fuels. The battery racks are designed to facilitate access to and exchange of the individual battery cassettes, and by combining the smaller size with easy access, a different kind of driving experience is enabled in which extended range (trips greater than 400 or 700 miles) is readily achieved.

The reduction gear 201 is not represented in detail, but reduction gearboxes may include hyphoid gears, spur gears, and so forth. Single-reduction hypoid axle drives (90 degrees) are recommended for road use. The drive train is offset and the gearbox contains a beveled ring or "crown" gear driven by a modified bevel pinion gear at the end of a drive shaft. Commonly, the gearbox may be single-reduction or double-reduction. The gearbox includes a differential carrier having planetary or "spider" gears and a side gear (not shown) so that the right and left axle shafts (sometimes each are termed a "half shaft") can spin at different rates. The differential effect has to do with the differential carrier. When both axle rotation velocities are equal, the differential carrier turns but the planetary gears do not spin on their independent axle pins, so the carrier, which is part of the ring gear, powers both axles at equal speed. When the vehicle turns, the rotation of the carrier is combined with a differential spin of the planetary gears, allowing the two half axles to spin at different speeds. Planetary gear direction reverses for left and right turns.

Beveled gears can be hypoid, amboid or spiral. Another gear option is a worm gear. Driving shafts are usually at 90 degrees to the worm axis because the worm wheel will have the maximal contact surface with a perpendicular driven gear helix when supplied with 45 degree beveled teeth. Worm gearsets may be non-throated, single-enveloping, or double-enveloping. In an enveloping gearset, the worm interface is carved out concavely to maximize the contact surface area and has the effect of bringing the driving shaft down toward the driven shaft.

Drive shafts can have several configurations. Parallel-shaft, intersecting shaft, non-intesecting/non-parallel shaft are known. In the intersecting shaft category, straight and spiral bevel gears are used. Special bevel gears of include Zerol, Coniflex, Formate, Revacycle and face gears. In the non-intersecting shaft category, worm gears, crossed helical and hypoid types are used. Crossed-helical "spiral gears can be used at shaft angles that are not perpendicular, but are inefficient because of the excessive slip component, leading to heating and wear.

Figure 3:
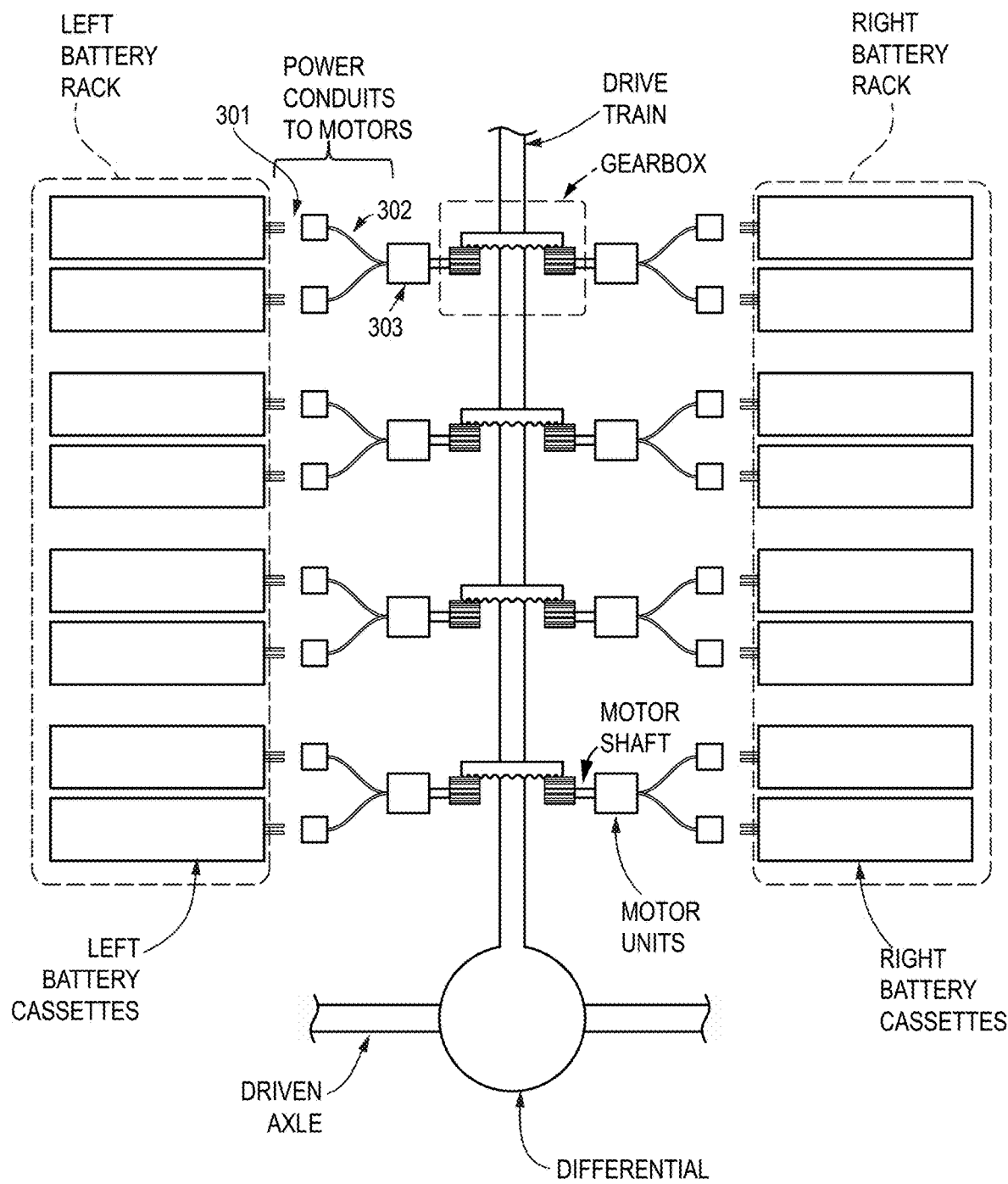
FIG. 3 is a block diagram of a multi-motored EV having four motors linked to a single common drive train for providing torque to an axle.

FIG. 3 is a block diagram of a multi-motored EV with drivetrain 300 having eight motors for providing torque to a driven axle. All the motors are linked to a single common drive train.

Each gearbox receives a shaft from two motors. Four gearboxes are linked to a single common drive shaft that terminates in a differential on the driven axle. A transmission may also be included but variable speed with DC motors is achieved using a controller 101 for "throttling" current to the motors as shown in FIG. 1.

Because there are eight motors and the motors are all ganged to a driven axle, the torque generated by each motor is additive. By using smaller motors, heat dissipation can be passive. By using DC motors, greater efficiency of battery energy consumption is realized. With eight like motors operated synchronously from a single controller 101, performance is not sacrificed.

A pair of battery racks (right and left) are provided for supporting and securing the battery cassettes. In this example, two battery cassettes are wired to each motor. The battery cassettes reversibly plug in to the motors and other electrical system components. Each battery cassette includes an electrical connector 301 for engaging an electrical conduit 302 to a corresponding motor 303.

Figure 4:
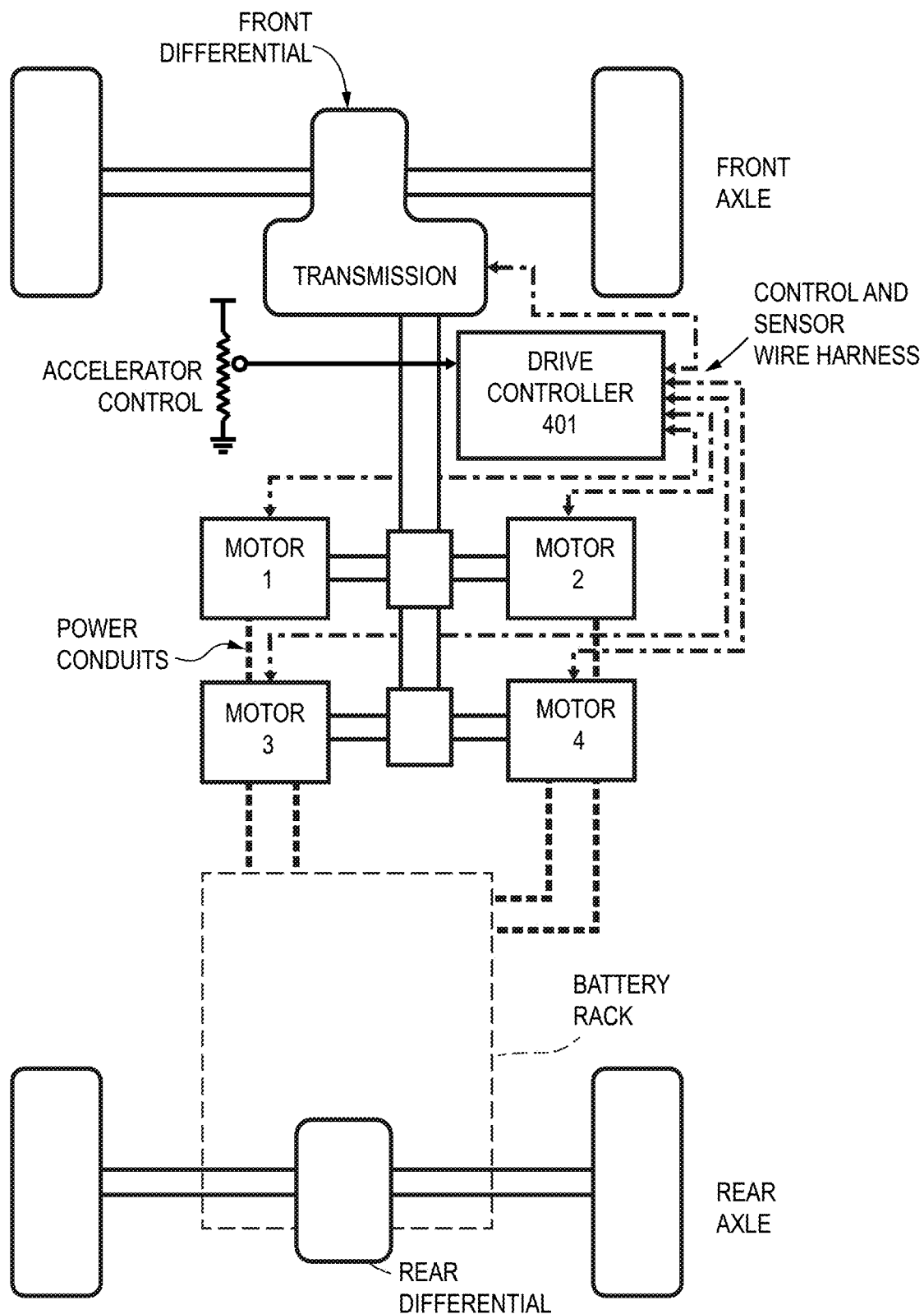
FIG. 4 is a block diagram of a multi-motored EV with front-wheel drive. An electronic transmission block is driven by a single common drive shaft shared by four motors.

FIG. 4 is a block diagram of a multi-motored EV with front-wheel drive. An electronic transmission block is driven by a single common drive shaft shared by four motors. The electronic transmission is part of and connects directly with a gearbox containing an epicentric hyphoid front differential. According to this embodiment, in addition to speed control achieved in a drive controller 401, a variable transmission is used to match motor function with driving requirements and for reverse when needed. The controller is connected to the motors via a wire harness that also carrys sensor feedback from the motors, transmission and axles.

Where all the motors are like motors having a like $n_b$ and gearing so that they can be used synchronously on a single common drive shaft, the transmission serves to remedy the gear ratio between motor speed and driving speed. The transmission can supply a reducing gear ratio as needed for acceleration and hill climbing, but can also be put in overdrive for highway cruising.

The transmission may be a continuously variable transmission (CVT) having a drive belt and two diameters of planetary gears driving a sun gear and a first pulley, and a second pulley connected to the first by a belt. The second pulley can expand so that the ratio of the diameter between two pulleys can be varied, changing the belt speed and rotational speed on the second pulley. Also, by reducing the size of the second pulley, the transmission can get an overdrive where the second pulley rotates faster than the first. The change is smooth and unnoticeable. A reinforced belt ensures longer life between servicing.

According to a second embodiment, a set of unlike motors are used. Motors 1 and 2 used for starting and accelerating may be disengaged when in cruise propulsion mode and motors 3 and 4 used for cruise driving may be disengaged during the initial starting mode. Motor 4, used to provide bursts of acceleration or regenerative braking, may be engaged continuously or only as needed. Motor 4 has a stator and field winding designed to saturate at a higher current, or may have higher torque due to a greater flux from its permanent magnets. Thus mixed species of motors are used to select the motor most suitable for the driving need.

In various embodiments, at least one of the DC motors is a permanent magnet motor and another is a series-wound DC motor. In other embodiments, the DC motors consist essentially of at least one series-wound DC motor configured to provide torque at zero speed in a start condition, at least one DC motor configured to conserve power in a cruise controlled condition, and at least one BLDC motor configured to provide torque for acceleration in passing and hill-climbing.

All motors are supplied from a stack of battery cassettes mounted in a battery rack. The battery rack as shown here is supported over the rear axle and is accessible via an access port so that individual battery cassettes can be swapped out as needed. While on-board charging may be enabled, depleted battery cassettes may also be replaced with fresh battery cassettes during a drive so that the driving is not interrupted. Time to replace one or more battery cassettes is reduced by providing a system of guideways and latches so that individual cassettes or trays are quickly pulled out and new battery cassettes or trays can be slid in. The specifics of the battery cassette form factor and the structure of the guideways, guiderails, bearing surfaces, latches, electric connectors, safety features, and so forth, are not limiting.

Figure 5:
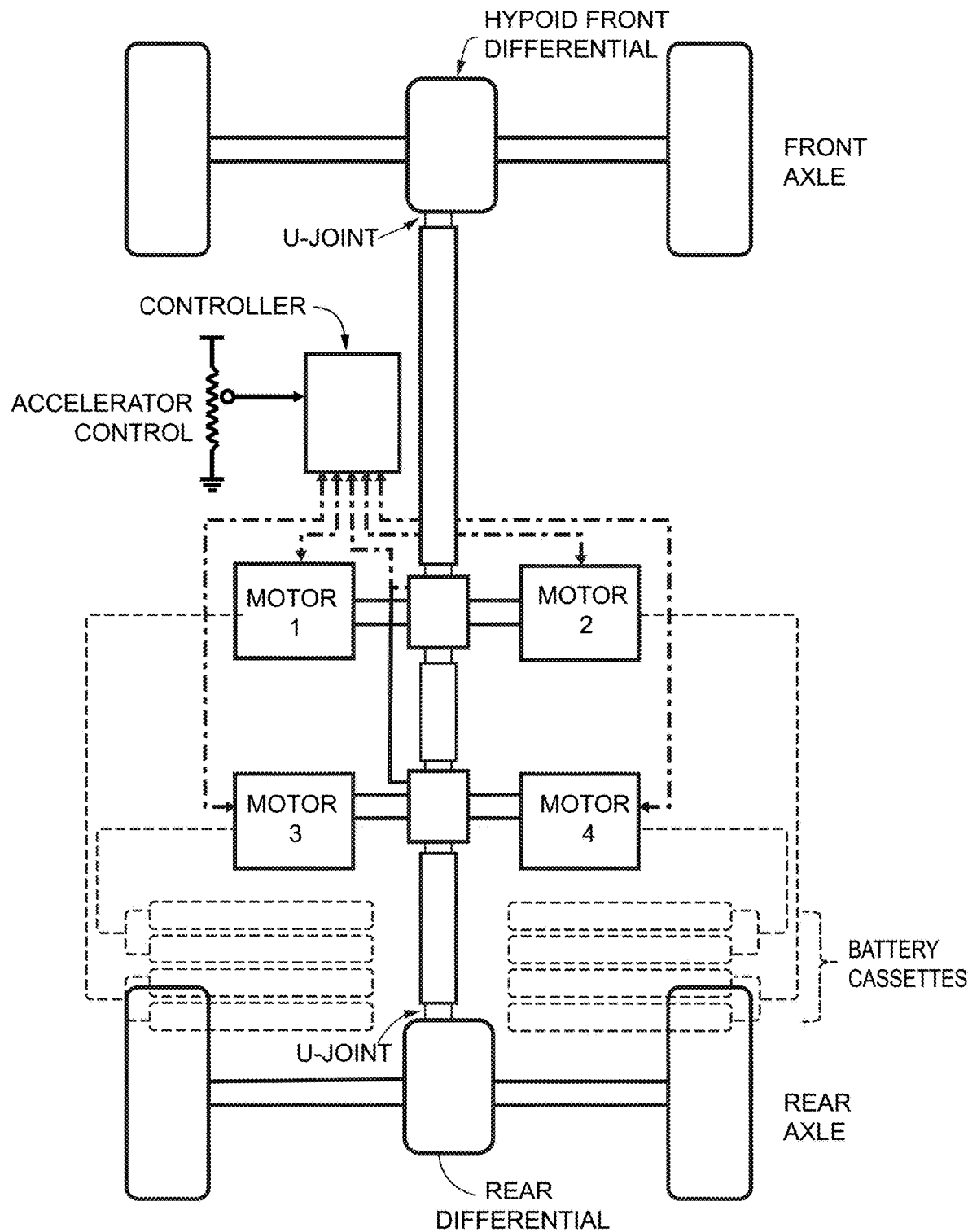
FIG. 5 is a block diagram of a multi-motored EV with four wheel drive.

FIG. 5 is a block diagram of a multi-motored EV with four wheel drive. Motors 1 and 2, used for starting and accelerating, can be disengaged when in cruise propulsion mode. The cruise motors 3 and 4 are continuously engaged and may be used for regenerative braking in one embodiment. A controller is coupled to all four motors.

The drive shaft is in three pieces and connects two gearboxes for motors 1,2 and motors 3,4 with the front and rear axles. Segments of the drive shaft include U-joints to absorb suspension motion. Spicer tandem axle construction offers a single gear mesh from motor to wheels and may be used if desired. The differentials can be locking or both axles can be powered separately. Steering is achieved with a rack and pinion gear or in combination with power steering.

Two stacks of battery cassettes are shown in this embodiment. Each motor is powered by two trays of NiMH cells assembled in a prismatic sheet and wired to deliver constant voltage over at least 70% of the discharge cycle (i.e., to 30% residual power).

For illustration, each of the battery cassettes is a 12.5 kW unit weighing 60 lbs. Four pairs of battery cassettes are mounted in a rack above the rear axle. Total power is 100 kW; total battery weight is 240 lbs. Each battery cassette is a 64V voltaic pile. Two lightweight trays are provided for each of the DC motors according to one embodiment. Provision is also made to provide current to the electrical circuitry of the controller, user interfaces, running lights, and so forth. Each battery cassette of the array is separately swappable using an electrical connector with snap lock locking mechanism for example. Swapping out of battery cassettes is accomplished at service stations en route to extend the range an EV can travel. The exchange of the relatively lightweight battery cassettes may be done manually if desired, or can be done robotically, using trays stocked in a national network of service stations. About 5 minutes, for example, may be sufficient to reload the vehicle with a full set of fully charged battery cassettes. The used trays are recharged at the service station or may be collected for recycling. Periodically the metals will be recovered and the battery cells remanufactured for reuse. Individual battery units may be removed separately for replacement or service. Alternatively, the battery cassettes may be recharged while in the vehicle by use of trickle chargers installed at charging stations, commercial buildings, or home garages. A deposit on the trays ensures that trays will be ultimately recycled.

The capacity to swap out batteries on-the-go permits greater range of travel without extended delays for recharging, such as for cross-country driving. In a typical application, the battery array is mounted over the rear axle, or example, and can be accessed behind the rear bumper for easy access. But battery arrays may also be mounted under the passenger compartment or in the front of the vehicle. Each battery housing is generally air cooled and is ported so as to be sealable with battery inside. Individual battery cassettes may slide or roll out, and lock when in use. In the event of damage due to a collision, the battery cells will be automatically disconnected for safety.

By dividing the batteries among the motor loads and by combining the torques at the drive shaft, an EV vehicle is realized that has exchangeably replaceable battery packs that are easily serviceable in the manner of a service station stop for refueling with gas but involving loading of new battery cassettes rather than liquid fuel. "Top-up" servicing requires only swapping out the exhausted battery cassettes. After removal, the trays would be recharged or sent out for materials recovery and recycling.

In contrast, for a conventional EV as marketed today, the larger motor and inverter cannot be readily removed. The larger cores generate heat that requires forced cooling. All permanent magnet motors are intolerant to excessive heat exposure. At 100° C., some neodymium magnets of motors lose half their field strength by demagnetization. The temperature rolloff characteristics of neodymium based magnets are improved by adding 5% of dysprosium another rare earth, but at great expense. Steps have been taken to control heating. The Prius motor, for example, will shut down to protect the permanent magnet synchronous motor (PMSM) magnets from demagnetizing at about 170° C., a major inconvenience to a driver stuck in the desert. No magnet can tolerate temperatures above its Curie temperature. Thus reduction in motor size, by ganging smaller motors on a common shaft to provide equivalent torque, derives an advantage in reduced need for supplemental or specialized cooling.

Figure 6:
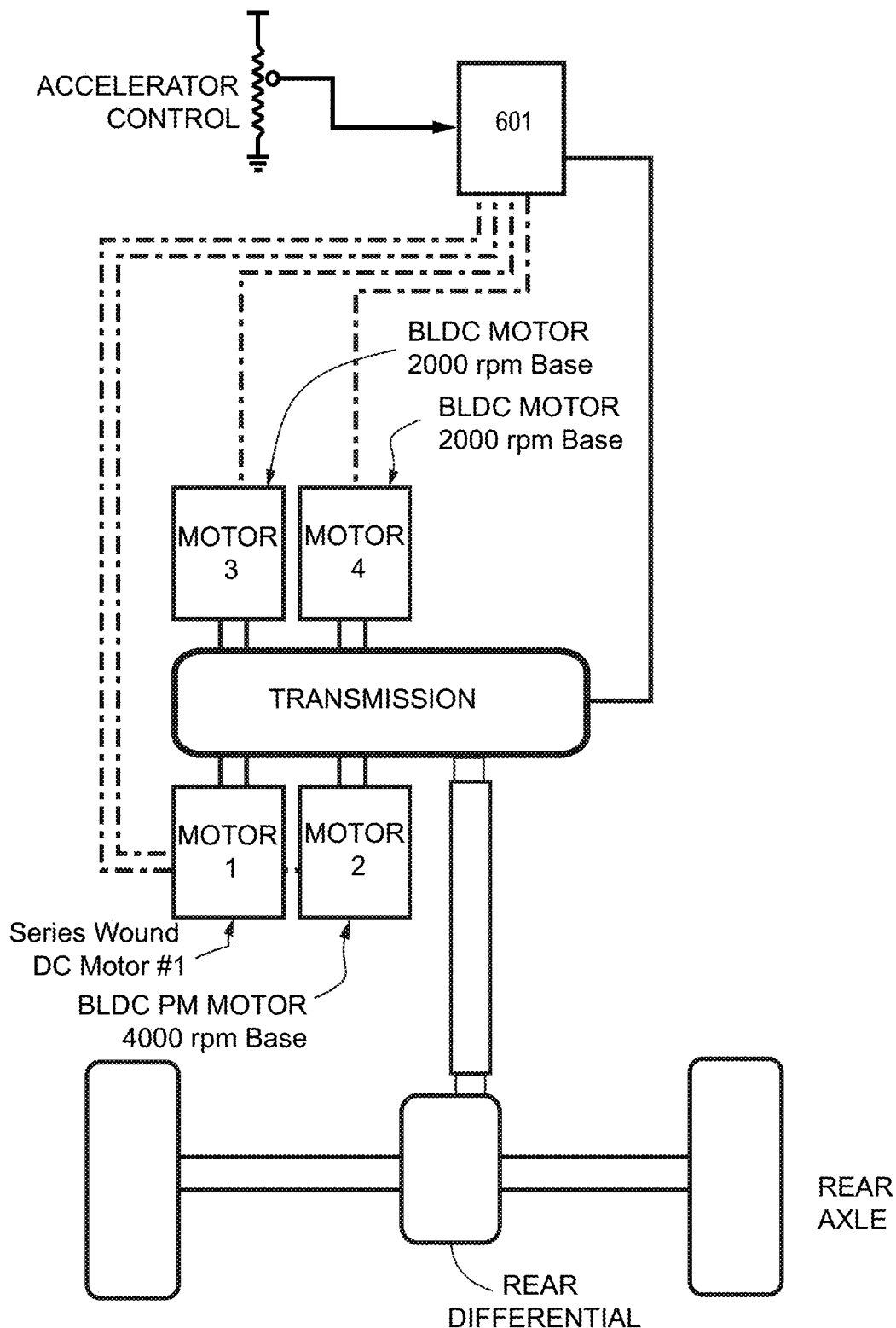
FIG. 6 is a block diagram of a multi-motored EV with rear-wheel drive.

FIG. 6 is a block diagram of a multi-motored EV with rear-wheel drive. Motors of different types are coupled to a common drive shaft through hypoid gearing of a transmission. Briefly, each motor shaft drives a hypoid pinion gear that engages crown gearing on a ring gear. The ring gear drives a first pulley wheel, which connects via a belt with a variable diameter second pulley wheel. In more detail, the electronic transmission is configured with a hypoid "crown gear" configured to accept four motor shaft inputs, each motor shaft with a hypoid beveled gearhead that engages a segment of the diameter of the crown wheel, according to one embodiment. The output of the transmission is a smoothly variable speed dependent on an adjustable pulley. Reverse is also provided through gearing in the transmission.

The transmission is connected to a rear differential by an off-center shaft that turns a bezel pinion gear and causes a ring gear to rotate. When turning, a system of planetary gears and spider gears distributes the rotational velocity to each wheel of the rear axle.

Motors 1,2 are configured for starting and acceleration; motors 3,4 are configured for highway driving. Motor 4 has a higher nb and may be provided with permanent magnets having greater flux density for more power. Motor 4 may also be designed to operate under field weakening conditions for short periods, as will yield greater torque at reduced efficiency. The rotors of the motors may spin passively when not needed or are separately disconnectable via a gear linkage in the transmission, eliminating the need for a friction clutchplate.

Coordinated control of the motors is provided by a controller 601. The accelerator is actuated (by hand or by foot) to initiate electrical power to the motors. The motors are mechanically linked to a drive shaft or shafts. The linkages may be geared and may include universal joints where needed. By controlling motor speed and gearing, fine control of battery efficiency is achieved. The user interface may include a display for monitoring power utilization so that the driver can exercise judgement in extending travel range versus the need for speed.

Optionally, LEDs on the dashboard show the number of battery cassettes having adequate charge to avoid a deep discharge cycle, as extrapolated to the driving destination. The user has the option to pull in to a service station and swap out one or more of the discharged batteries, to go home and begin a recharging cycle on all the batteries, to go into a different driving mode that is less power demanding, or to override the battery controller and go into a deep discharge mode, either for a short time as in an emergency, or for extended range. The deep discharge of any of the batteries is expected to reduce the long term battery life.

Each battery unit is a smart battery and includes a life clock and usage data logger, a unit identifier, a fuel gauge that reports to the battery controller, a temperature sensor, two contacts for engaging a current bus electrically wired to the battery controller, a chassis ground pin, and a twist-lock handle for reversibly engaging the battery in its housing. Each battery unit may be manually removed and swapped out.

Electric vehicles (EV) are required to operate over a range of driving conditions, or "propulsion states." Driving characteristics in starting, accelerating, cruising, decelerating, and idle are of general interest. UDDS (urban dynamometer driving schedule) is an industry standard driving condition testing protocol that attempts to relate performance to a mix of real-world driving conditions in which idle, starting torque, acceleration, hill climbing, cruise and braking are all considered. Another comparative testing standard is HWFET (highway fuel economy driving schedule). The real-world propulsion conditions that make up the driving schedules are described in more detail in Huynh T A and M F Hsieh, 2018, Performance analysis of permanent magnet motors for electric vehicles (EV) traction considering driving cycles; Energies 11:1385 (doe:10.3390/en1106385), which is incorporated here in full by reference. No one motor can be optimized for all driving states when all factors are considered, including thermal load, battery efficiency, and the relationship between motor speed, torque and power.

Figure 7:
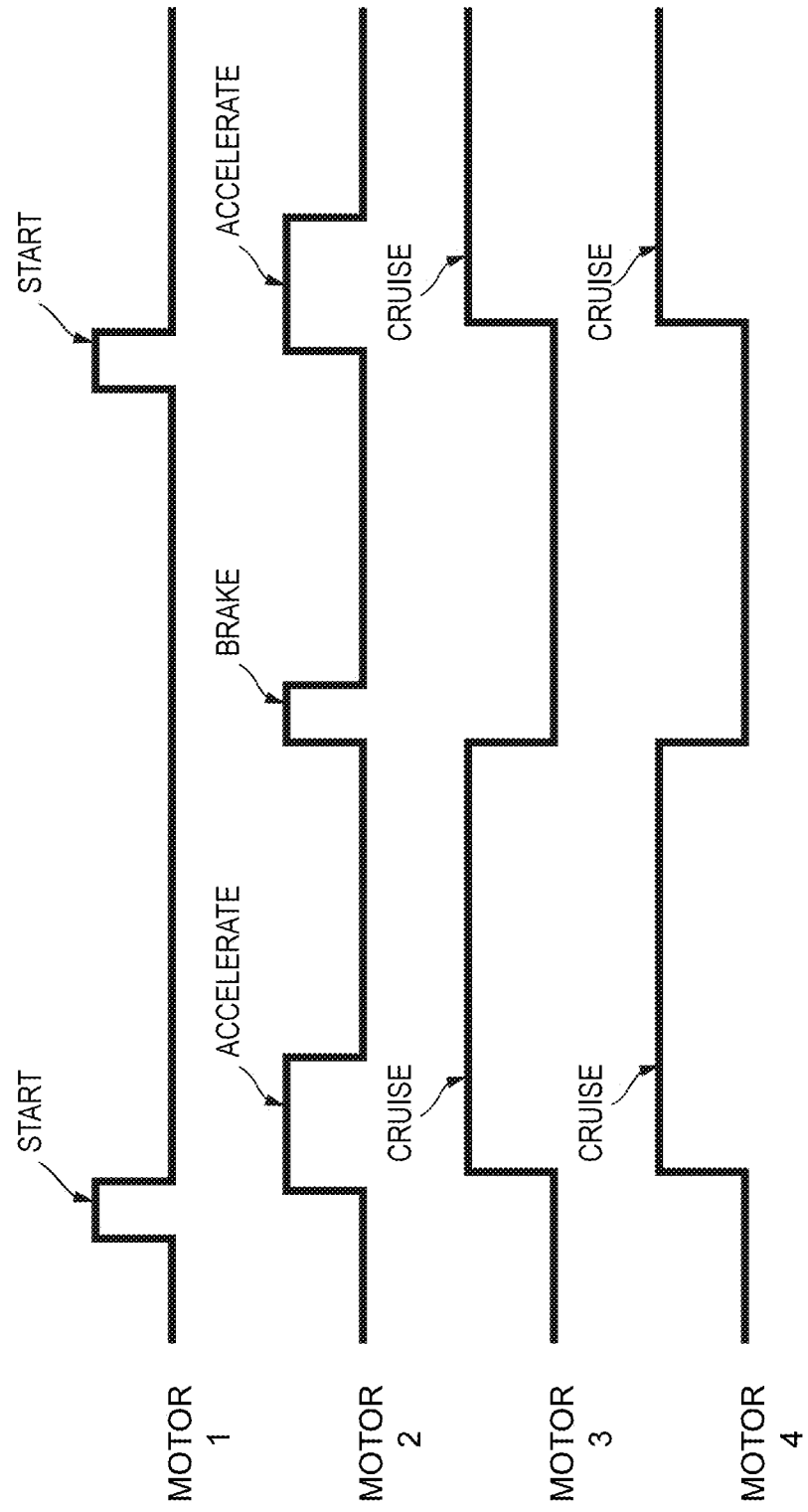
FIG. 7 is a time-sequence showing use of four motors for periods of initial start to idle, acceleration (or hill climbing), cruise, braking, and a second cycle of start and accelerate.

FIG. 7 is a time-sequence showing use of four motors for periods of initial start to idle, acceleration, cruise, braking, and a second cycle of start and accelerate, as at a stoplight. Four motors are shown. Here complementary motor types are selected for each of the driving propulsion modes. Two of the motors are operated in unison and are tuned for optimal performance in cruise-controlled driving, as on open highways. Motor 1 is a series-wound DC motor used in starting and accelerating; motor 2 is a brushless DC motor with a higher base speed of 4000 RPM for acceleration and hill climbing; motors 3 and 4 are also brushless DC motors but are designed with an intermediate base speed of 2000 RPM for efficient operation over long stretches of steady speed in overdrive, typically in the 40 to 70 mph range, but also can be controlled to be operated in field weakened range where extra power is needed, as for hill climbing, at speeds >2000 RPM and passing.

For example, a configuration using mostly motors 1 and 2 may be adapted for city driving, such as in a downtown grid, where frequent starting, stopping and acceleration is required. With smaller batteries operated in parallel, a "plug-and-play" system is realized in which the lifespan of any individual battery due to hysteresis is not lengthened, but the costs associated with replacement are minimal.

A battery controller is optional. A first battery configuration is pre-programmed in the battery controller for driving in highway cruising propulsion mode. Charge leveling is not generally used. Individual battery units are taken off line in sequence rather than be charge leveled and deep discharged. At any given time, the voltage available to the motor is generally the maximum of one battery unit, such as 64V as an example, but in some instances two batteries may be coupled in the controller so that applied voltage is 128V, for example. Battery units that are taken off line can be reserved for emergency use or reconfigured so that a battery having lower charge is assigned to low amperage tasks such as system electrification. If the user enters a route that requires more acceleration or hill climbing, then the battery configuration can be reassigned. If the user is in a city downtown driving mode that requires frequent stops and starts, then the battery configuration can be reassigned to allot more battery units to the start motor 1, a series wound DC motor. A clutch or transmission may be controlled to disengage the start motor when its low-speed torque is not required. Series wound DC motors can be set to hold position on a hill at zero speed and its torque applied according to the load. Torque can be adjusted by a change in voltage in a speed range of 0 rpm to the base speed of the motor for any load up to the rated power of the motor. In other driving conditions, other motors are designed to optimize efficiency according to motor speed and load.

Figure 8:
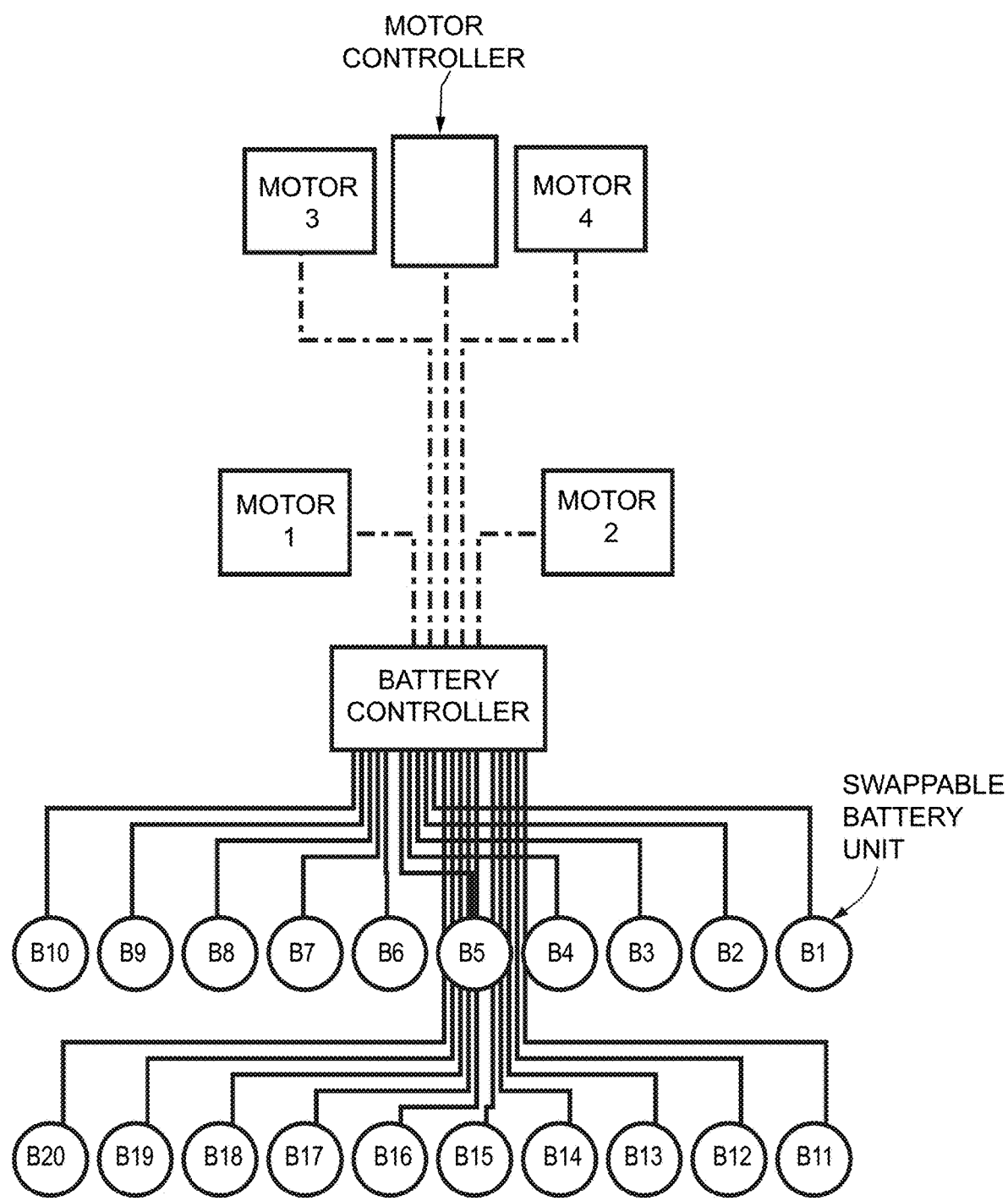
FIG. 8 is a block diagram of a four motor propulsion system with motor controller and battery controller.

FIG. 8 is a block diagram of a four motor propulsion system with motor controller and battery controller. The battery controller and the motor controller are programmed for coordination in control of the vehicle systems and power distribution.

The battery controller may be configured for supplying a voltage and a current to the DC motors from one or more battery cassettes mounted on the battery rack or racks. The battery controller is programmable to allocate or reallocate the number of battery units linked to any one of the DC motors according to a driving protocol having one or more of propulsion states that define an idle mode, a start mode, a cruise mode, and an acceleration, hill climbing or braking mode. In this way, power efficiency may be managed, or at least planned out, for efficiency by a cloud host. Tradeoffs may be made for performance, as in passing, and for those on-demand situations, the driver controls the vehicle.

Battery controllers may be configured so that the number of batteries tied to any particular load is variable. If more battery units are needed for one motor than another (which might be powered down), the controller can re-route the power. If fewer battery units are needed for non-motor vehicular system with the headlights off, then the controller can route the excess power to the motors, for example. This is an advantage of the modular construction of the battery cassettes and independent electrical connections. Reduction of size of the battery cassettes is also an innovation because the weight of conventional battery packs has limited the kind of fuel-up-and-go driving consumers are accustomed to with liquid fuels. With the smaller battery cassettes, swapping out discharged cells for remote recharging becomes feasible without the need for specialized tools and equipment.

Figure 9A:
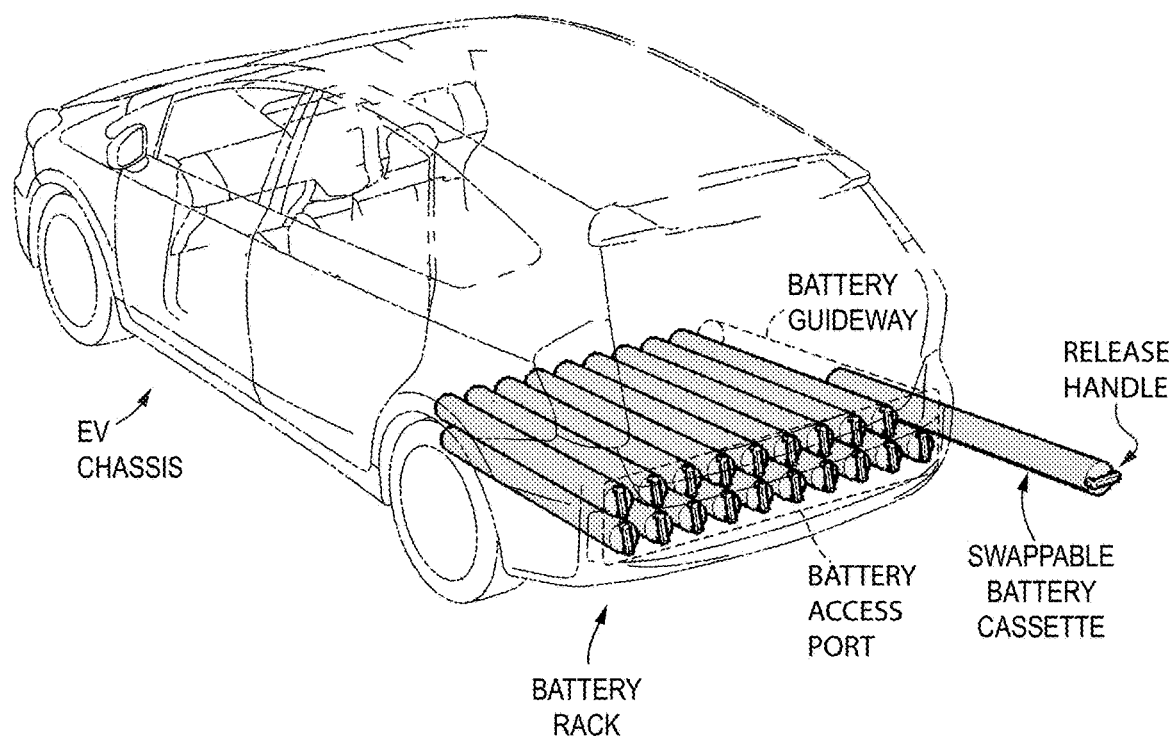
FIG. 9A is a view of another multi-motored EV with replaceable battery cassettes. Each battery cassette is insertably removable from a battery bay in a battery rack.
Figure 9B:
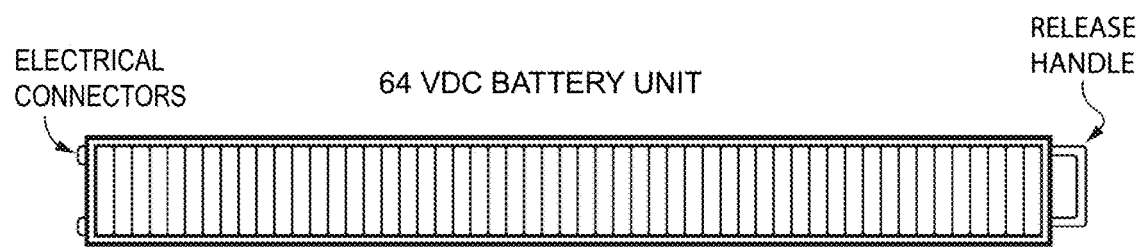
FIG. 9B is a view of a battery cassette with cutaway to show a voltaic pile.

FIG. 9A is a view of another multi-motored EV with replaceable battery cassettes. FIG. 9B illustrates a sample of a battery cassette with release handle and internal voltaic pile with electrical connectors. The battery cassettes may be cylindrical as shown or may be paralleliped in form factor, for example.

Each battery cassette is insertably removable from a battery bay in a battery rack. Each battery bay is provided with an electrical contact for conveying power from the battery to a motor. Each battery cassette is latched and secured when in place in the battery bay, but as shown here, can be removed with the twist of a handle and then slides out along a guideway. The reverse occurs during installation of a fresh battery cassette. The individual battery cassette form factor is flexible, but a convenient size for handling is in the range of 20 to 50 kg each, for example. For use with robotic service systems, larger sizes may be used. Shown here are a total of twenty battery cassettes for delivering power to the motors and to the drive systems.

In this instance, a battery controller is wired to a twenty-unit array of battery cassettes and each battery cassette may be electrically switched to any of the motors according to a driving protocol, including route requirements, planned propulsion mode mix en route, and driving habits of the user. Cloud resources may be use to optimize driving protocol and route selection and radio means for accessing a cloud host may be provided. A user interface or a cloud host may be configured to control a driving protocol having one or more propulsion states. One or more driving protocols may be adapted according to a driving route geography and terrain, or may be adaptive from sensor feedback that accompanies the driving experience. The controller or the cloud host may learn to adapt the driving protocol or protocols according to a database of experience in driving, either specific to a particular driver or vehicle, or to experience with a driving route, and taking into account time of day, traffic, road conditions, and so forth.

Battery cassettes typically are switched off before deep discharge hysteresis is incurred. Artificial intelligence may be used to flexibly adapt motor usage to the driver's route to an intended destination. Batteries will be re-allocated if the driving protocol is altered or if the route changes. A decision to take the Coast Highway instead of I-5 can result in the need for greater energy for hill climbing but less time at speeds exceeding 60 mph. If satellite traffic reports shows more congestion on the highways, more battery reserve can be shifted to the start and stop motors and away from the cruise motors by reallocating a larger number of battery units for the revised driving conditions and expected propulsion states. But in an emergency, batteries can be redesignated for deep discharge and the calculation of battery usage will be made on the distance to a recharging station (or a station where new batteries can be swapped out).

To illustrate adaptive battery usage, battery allocation may be compared for different kinds of driving. A first adaptive battery configuration in which battery unit allocation is two to the starting motor, three to the acceleration motor, fourteen to the cruise motors, and one for system power to the controllers and chassis accessories. This configuration is pre-programmed in the battery controller for most of the driving in highway cruising propulsion mode. Charge leveling is not generally used. Individual battery cassettes are taken off line in sequence rather than be charge leveled and deep discharged. At any given time, the voltage available to the motor is generally the maximum of one battery unit, such as 64V in this case, but in some instances two batteries may be coupled in the controller so that applied voltage is 128V, for example. Battery units that are taken off line can be reserved for emergency use or reconfigured so that a battery having lower charge than an acceptable level for powering the motors is assigned to low amperage tasks such as system electrification. If the user enters a route that requires more acceleration or hill climbing, then the battery configuration can be reassigned. If the user is in a city downtown driving mode that requires frequent stops and starts, then the battery configuration can be reassigned to allot more battery units to the start motor, a series wound DC motor. A clutch may be used to place the start motor in idle when torque is not required. Series wound DC motors can be set to hold position on a hill at zero speed and torque applied according to the load. Torque can be adjusted by a change in voltage in a speed range of 0 RPM to the base speed of the motor for any load up to the rated power of the motor.

Generally, the battery units are configured with an ID number and a data logger for tracking usage, and if used with a battery controller, the controller is configured to auto-configure the battery array according to a driving protocol and a route broken into multiple propulsion states. The motor controller and/or the battery controller may be configured to access cloud resources for managing a driving protocol according to a projected route. The motor and battery use will be optimized by breaking the route into one or more propulsion states mated to battery and motor allocation.

The battery cassettes are not limited to any particular form factor. In some embodiments, the trays may be prismatic, with hundreds of cylindrical cells arrayed side-by-side in close packing. In other instances, the trays may be cylindrical, as in a canister, where the battery units are stacked within the canister. Each layer of the Voltaic pile contributes to the total voltage across the poles. In one embodiment, layers consist of concentric rings of NiMH batteries. In another embodiment, layers consist of a LiPo polymeric matrix sandwiched between two foil layers may be stacked to produce 64V in one embodiment; subclusters of NiMH cells, for example of the AA type, may be wired in parallel and clusters made up of subclusters wired in series may be used to achieve the required voltage for the tray.

Each battery cassette is received in a separate battery rack and the battery racks are generally air cooled, either with or without forced air ventilation. A handle is used to lock the battery cassette against its terminals after it is inserted into the rack. A door is also provided so that the batteries are in a sealed chamber when in use. During battery cassette exchange, the battery unit is slid in and out of a guideway that can include guiderails or a safety housing, for example. The housing can be grounded to the chassis and may include a fuse to disable the battery in the event of short. A shutdown override may also be used that will disable the battery in the event of thermal overload. Generally, air cooling or forced air cooling is used, but in some instances, the cooling regime is supplemented with circulatory liquid cooling and a radiator.

The individual battery cassettes are placed in the vehicle to balance load and provide convenient access. In some instances a front end battery rack and a rear end battery rack are supplied. In other instances, battery access is through the side between the axles. The battery cassettes are electrically connected to the DC motors with battery/motor conduits that may be made of copper, aluminum, graphene or an electrically conductive polymer, for example. To reduce weight, the conduction pathways may be made of spun graphene rather than copper or aluminum.

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

EXAMPLE I

In one embodiment, during operation, the battery controller may allocate battery capacity differentially during driving. For example, battery unit allocation may be four trays to the starting motor, seven trays to the acceleration motor, eight trays to the cruise motors, and one tray for system power to the controllers and chassis accessories. This configuration is adapted for city driving, such as in a downtown grid, where frequent starting, stopping and acceleration is required. With smaller batteries operated in parallel, a "plug-and-play" system is realized in which the lifespan of any individual battery due to hysteresis is not lengthened, but the costs associated with replacement are minimal. For other kinds of driving, the battery allocation may shifted, for example for highway driving more battery capacity is selected for the BLDC motors used in cruise, and only two battery cassettes are used for the seldom used starting motor.

As driving continues, some batteries are partially discharged to a residual charge level at which they are taken off line by a battery controller according to one embodiment. The user has the option to pull in to a service station and swap out one or more of the discharged batteries, to go home and begin a recharging cycle on all the batteries, to go into a different driving mode that is less power demanding, or to override the battery controller and go into a deep discharge mode, either for a short time as in an emergency, or for extended range. The deep discharge of any of the batteries is expected to reduce the long term battery life.

Each battery unit is a smart battery and includes a life clock and usage data logger, a unit identifier, a fuel gauge that reports to the battery controller, a temperature sensor, two contacts for engaging a current bus electrically wired to the battery controller, a chassis ground pin, and a twist-lock handle for reversibly engaging the battery in its housing. Each battery unit may be manually removed and swapped out.

EXAMPLE II

To give an impression of the outstanding performance that can be achieved by a brushless permanent magnet motor, a bench test was done with a BLDC motor which begins with a linear ramp from zero to 6000 rev/min in 0.06 sec; followed almost immediately by a demand for the speed to reverse to 6000 rev/min revolving in the opposite direction, then back to full forward speed and finally to rest, the whole process lasting less than one second. This agility is made possible by the lightness of the rotor, the use of permanent magnets, and by providing a compact encoder for high speed pole switching.

EXAMPLE III

Battery cassette size and weight are engineered so that manual exchange of trays is enabled. Battery cassettes are supported in racks accessible from the vehicle exterior and are provided with bearing surfaces so that the trays can be physically removed and new trays inserted on guide rails. Each tray has a plug-in connector that engages when the tray is locked home in the rack. To size the trays, a calculation was made as follows:

Total power capacity per vehicle is 100 kW; total battery weight is 800 lbs—but the battery rack is built to accommodate 20 battery cassettes. Each battery unit is a 5 kW unit weighing 40 lbs. Each battery cassette is a 64V voltaic pile and includes a two-prong plug, optionally with a chassis ground, for making an electrical connection to one or more of the DC motors. Provision is also made to provide current to the electrical circuitry of the controller, user interfaces, running lights, and so forth. Each battery cassette in the rack is separately swappable using a twist lock connector mechanism with safety override.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

The invention claimed is:

1. An electric vehicle having lightweight exchangeably replaceable battery cassettes, which comprises:
    a vehicular chassis with one or more driven axle;
    a single common drive shaft for each driven axle;
    a battery rack having an access port and a plurality of individual bays configured to receive and secure the exchangeably replaceable battery cassettes; one battery cassette individually insertable into each of the bays, each bay having a guideway externally accessible on the vehicular chassis, wherein each guideway is configured to receive and secure therein a battery cassette;
    three or more of DC electric motors operated in synchrony, each DC electric motor having an electrical power connection to the one or more bays in the battery rack;
    wherein the three or more DC electric motors are in mechanical linkage with a single common drive shaft having an operative mechanical connection to a wheel axle in need of rotary power; and,
    wherein the total torque deliverable at the wheel axle is the sum of the torque output from all of the DC electric motors.

2. The electric vehicle of claim 1, wherein the drive shaft is configured with a variable gear train.

3. The electric vehicle of claim 1, wherein the drive shaft is configured with a transmission having an electronic clutch and a reverse gear.

4. The electric vehicle of claim 3, wherein the transmission is configured to optimize motor efficiency in one or more of propulsion states that define an idle mode, a start mode, a cruise mode, and an acceleration or braking mode.

5. The electric vehicle of claim 1, wherein the driven axle is configured with a differential gearbox.

6. The electric vehicle of claim 1, comprising a motor controller.

7. The electric vehicle of claim 6, comprising a battery controller.

8. The electric vehicle of claim 7, wherein the motor controller and the battery controller are part of a propulsion state resource allocation system having one or more propulsion states controllable by a user interface or by a cloud host.

9. The electric vehicle of claim 1, wherein the motor controller is operative to control an encoder, resolver, H-bridge, or transistor array configured to deliver direct current to each motor in a synchronous pattern of pulses.

10. The electric vehicle of claim 9, further characterized in that the drive train does not include an AC motor or an inverter.

11. The electric vehicle of claim 1, wherein the vehicle is configured to be controlled in one or more propulsion states by a user interface or by a cloud host.

12. A system for deploying electric vehicles in a national transportation infrastructure, wherein the system comprises;
    a plurality of electric vehicles of claim 1, each electric vehicle having installed therein a plurality of lightweight exchangeably replaceable battery cassettes of claim 1; and,
    a plurality of service stations, wherein each service station is configured to, on demand:
        (i) receive an electric vehicle of claim 1;
        (ii) access the battery rack to remove one or more of the exchangeably replaceable battery cassettes (removed trays) from the bays of the battery rack;
        (iii) replace the removed trays with battery cassettes (fresh battery cassettes) having a full electrical charge;
        (iv) verify any electrical connection and security lock for any fresh battery cassettes;
        (v) disengage with the electric vehicle so that a driver thereof may return to driving.

13. The system of claim 12, which comprises a step for accessing a battery control to exchange data that identifies partially or fully discharged battery cassettes (depleted battery cassettes) in need of replacement.

14. The system of claim 13, which comprises a robot programmed to automatically provide services that include accessing the battery rack, replacing any depleted battery cassettes with fresh battery cassettes, and collecting payment for any services provided.

15. The system of claim 12, wherein the system comprises services for manually accessing the battery rack, removing any depleted battery cassettes, and installing fresh battery cassettes, then collecting payment for the service.

16. An electric vehicle having lightweight exchangeably replaceable battery cassettes, which comprises:
- a vehicular chassis with one or more driven axle;
- a single common drive shaft for each driven axle;
- a battery rack having an access port and a plurality of individual bays configured to receive and secure the exchangeably replaceable battery cassettes; one battery cassette individually insertable into each of the bays, each bay having a guideway externally accessible on the vehicular chassis, wherein each guideway is configured to receive and secure therein a battery cassette;
- three or more of DC electric motors, each DC electric motor having an electrical power connection to the one or more bays in the battery rack;
- wherein the three or more DC electric motors are in mechanical linkage with a single common drive shaft having an operative mechanical connection to a wheel axle in need of rotary power; and,
- wherein each of the three or more DC motors is configured to optimize motor efficiency in one or more of propulsion states that define an idle mode, a start mode, a cruise mode, and an acceleration or a braking mode.

17. The electric vehicle of claim 16, wherein at least one of the DC motors is a permanent magnet motor and another is a series-wound DC motor.

18. The electric vehicle of claim 16, wherein the three or more DC motors consist essentially of at least one series-wound DC motor configured to provide torque at zero speed in a start condition, at least one DC motor configured to conserve power in a cruise controlled condition, and at least one BLDC motor configured to provide torque for acceleration in passing and hill-climbing.

19. The electric vehicle of claim 16, wherein the drive shaft is configured with a transmission having an electronic clutch and a reverse gear.

20. The electric vehicle of claim 16, wherein the transmission is configured to optimize motor efficiency in one or more of propulsion states that define an idle mode, a start mode, a cruise mode, and an acceleration or braking mode.

21. The electric vehicle of claim 16, wherein the driven axle is configured with a differential gearbox.

\* \* \* \* \*